US010657989B1

(12) United States Patent
Biskeborn et al.

(10) Patent No.: US 10,657,989 B1
(45) Date of Patent: May 19, 2020

(54) TAPE HEAD MODULE HAVING RECESSED PORTION(S) AND AIR APERTURE(S) FOR PROVIDING AN AIR BEARING BETWEEN A TAPE AND THE MODULE

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/224,664

(22) Filed: Dec. 18, 2018

(51) Int. Cl.
*G11B 15/64* (2006.01)
*G11B 5/187* (2006.01)
*G11B 5/008* (2006.01)
*G11B 5/31* (2006.01)
*G11B 5/255* (2006.01)
*G11B 15/60* (2006.01)

(52) U.S. Cl.
CPC ........ *G11B 5/1871* (2013.01); *G11B 5/00826* (2013.01); *G11B 5/187* (2013.01); *G11B 5/255* (2013.01); *G11B 5/3106* (2013.01); *G11B 15/60* (2013.01); *G11B 15/64* (2013.01)

(58) Field of Classification Search
None
See application file for complete search history.

(56) References Cited

U.S. PATENT DOCUMENTS

| 3,327,916 A * | 6/1967 | Weidenhammer .... F16C 29/025 242/615.11 |
| 4,479,158 A * | 10/1984 | Froehlich ............... G11B 5/187 360/130.1 |
| 6,122,147 A * | 9/2000 | Fahimi ................. G11B 5/1871 360/130.21 |

(Continued)

FOREIGN PATENT DOCUMENTS

EP  1107237 A1  6/2001

OTHER PUBLICATIONS

Raeymaekers et al., "Design of a dual stage actuator tape head with high-bandwidth track following capability," Microsystem Technologies, Feb. 19, 2009, 5 pages.

(Continued)

*Primary Examiner* — William J Klimowicz
(74) *Attorney, Agent, or Firm* — Zilka-Kotab, P.C.

(57) ABSTRACT

In one general embodiment, an apparatus includes a module having a tape bearing surface, and an array of transducers extending along the tape bearing surface. The module has an aperture extending therethrough from the tape bearing surface to an opposing side of the module for permitting passage of air therethrough to the tape bearing surface. In another general embodiment, a method includes adhering a closure to a thin film layer formed on a substrate. The thin film layer has an array of transducers extending therealong. The closure has a channel therein which forms an aperture when the closure is coupled to the thin film layer. A tape bearing surface is formed along the substrate, closure and (Continued)

thin film layer. A recessed portion is formed in the tape bearing surface. An opening of the aperture is present in the recessed portion upon forming the recessed portion.

11 Claims, 25 Drawing Sheets

(56) References Cited

U.S. PATENT DOCUMENTS

| | | | |
|---|---|---|---|
| 6,433,959 B1* | 8/2002 | Lakshmikumaran | G11B 5/10 360/122 |
| 8,085,496 B2 | 12/2011 | Hachisuka et al. | |
| 8,154,826 B2 | 4/2012 | Hachisuka | |
| 8,373,944 B2* | 2/2013 | Biskeborn | G11B 5/00826 360/110 |
| 9,001,464 B2* | 4/2015 | Lakshmikumaran | G11B 5/008 360/122 |
| 2009/0154024 A1* | 6/2009 | Hachisuka | G11B 5/00813 360/313 |
| 2009/0310248 A1* | 12/2009 | Hachisuka | G11B 5/314 360/77.01 |
| 2010/0195241 A1 | 8/2010 | Dugas et al. | |
| 2011/0002065 A1 | 1/2011 | Dugas et al. | |
| 2012/0008234 A1* | 1/2012 | Biskeborn | G11B 5/584 360/77.12 |
| 2014/0059842 A1* | 3/2014 | Biskeborn | G11B 5/29 29/603.01 |
| 2016/0055867 A1* | 2/2016 | Engelen | G11B 5/255 360/125.72 |
| 2017/0337942 A1 | 11/2017 | Engelen et al. | |
| 2019/0287555 A1* | 9/2019 | Biskeborn | G11B 5/29 |

OTHER PUBLICATIONS

U.S. Appl. No. 15/924,109, filed Mar. 16, 2018.
U.S. Appl. No. 15/968,144, filed May 1, 2018.

* cited by examiner

TAPE HEAD MODULE HAVING RECESSED PORTION(S) AND AIR APERTURE(S) FOR PROVIDING AN AIR BEARING BETWEEN A TAPE AND THE MODULE

BACKGROUND

The present invention relates to data storage systems, and more particularly, this invention relates to a tape head module having recessed portion(s) and air aperture(s) for providing an air bearing between a tape and the module.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, the goal is to increase track density on the recording tape medium while decreasing the thickness of the magnetic tape medium. In a tape drive system, magnetic tape is moved over the surface of the tape head at high speed. This movement tends to cause formation of a film of air between the head and tape. Usually the tape head is designed to minimize the spacing between the head and the tape. The spacing between the magnetic head and the magnetic tape is crucial so that the recording gaps of the transducers, which are the source of the magnetic recording flux, are close to the tape to effect efficient signal transfer, and so that the read element is close to the tape to provide effective coupling of the magnetic field from the tape to the read element.

However, this close spacing of the tape medium and the tape bearing surface results in various tribological issues becoming more pronounced, among them, tape/head stiction and running friction. Particularly, as the linear density of magnetic tape recording increases, the magnetic spacing must be reduced, requiring smoother heads and tapes. These may be associated with increased startup friction (stiction), increased running friction, and more instantaneous speed variations (ISVs). In addition, tape-head wear may limit tape head lifetime, and contact-generated debris can adhere to the head, increasing the magnetic spacing.

There is a need in the art for reducing friction when the tape medium travels across the tape head while ensuring the region of the tape that is subject to read and write operations at the transducer elements remains close to the transducer elements to ensure accurate read and write operations without unacceptable spacing loss.

SUMMARY

An apparatus, according to one embodiment, includes a module having a tape bearing surface, and an array of transducers extending along the tape bearing surface. The module has an aperture extending therethrough from the tape bearing surface to an opposing side of the module for permitting passage of air therethrough to the tape bearing surface.

A method, according to one embodiment, includes adhering a closure to a thin film layer formed on a substrate. The thin film layer has an array of transducers extending therealong. The closure has a channel therein which forms an aperture when the closure is coupled to the thin film layer. A tape bearing surface is formed along the substrate, closure and thin film layer. A recessed portion is formed in the tape bearing surface. An opening of the aperture is present in the recessed portion upon forming the recessed portion.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a module having a tape bearing surface, and an array of transducers extending along the tape bearing surface. The module has an aperture extending therethrough from the tape bearing surface to an opposing side of the module for permitting passage of air therethrough to the tape bearing surface.

In another general embodiment, a method includes adhering a closure to a thin film layer formed on a substrate. The thin film layer has an array of transducers extending therealong. The closure has a channel therein which forms an aperture when the closure is coupled to the thin film layer. A tape bearing surface is formed along the substrate, closure and thin film layer. A recessed portion is formed in the tape bearing surface. An opening of the aperture is present in the recessed portion upon forming the recessed portion.

Figure 1A:
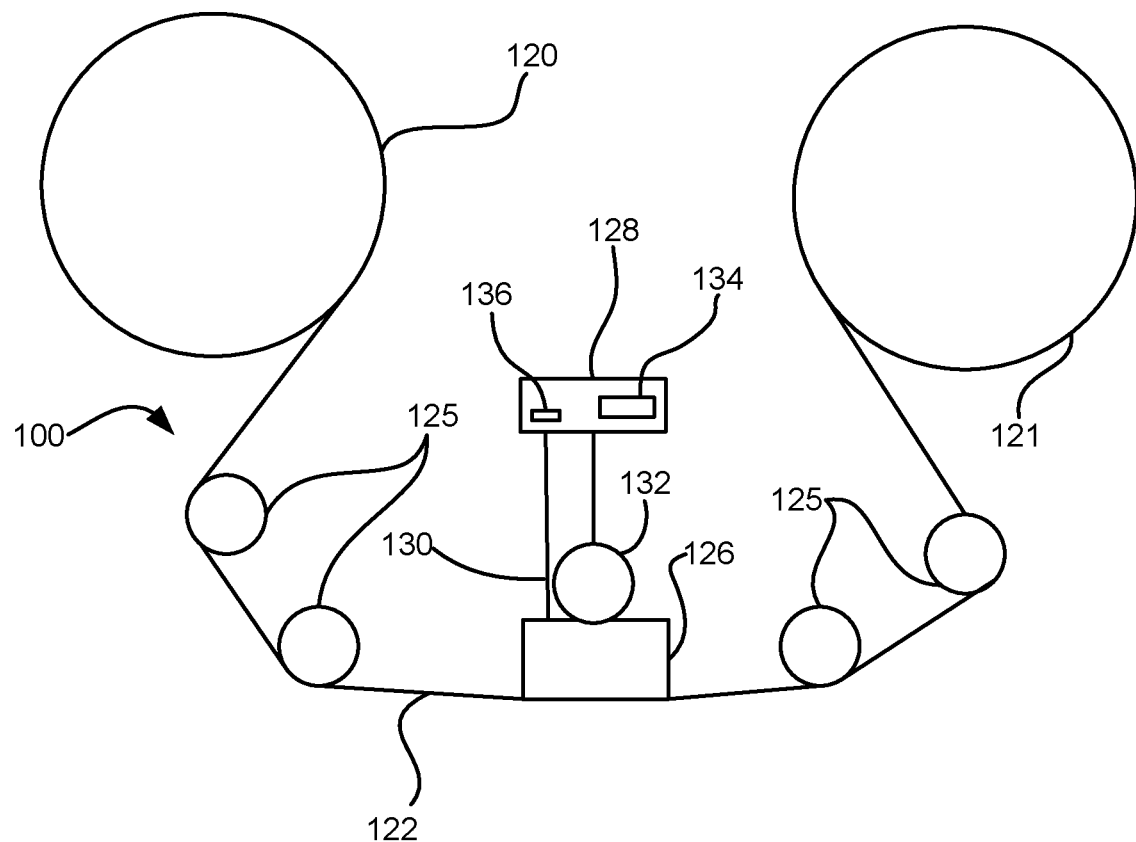
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
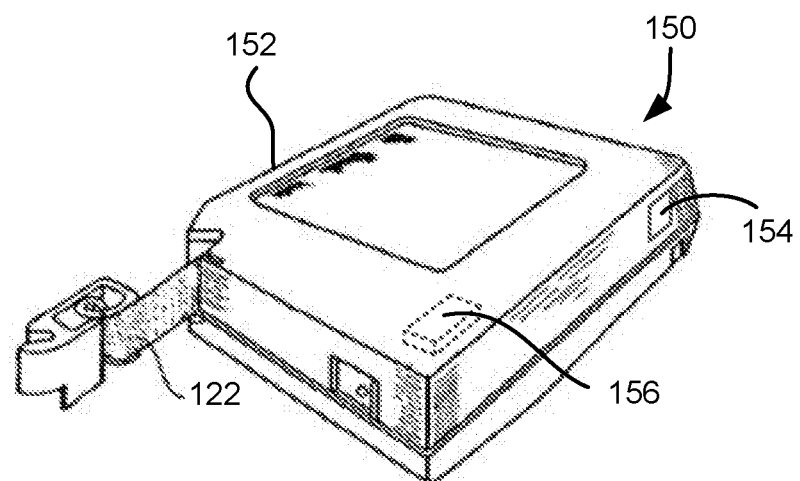
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
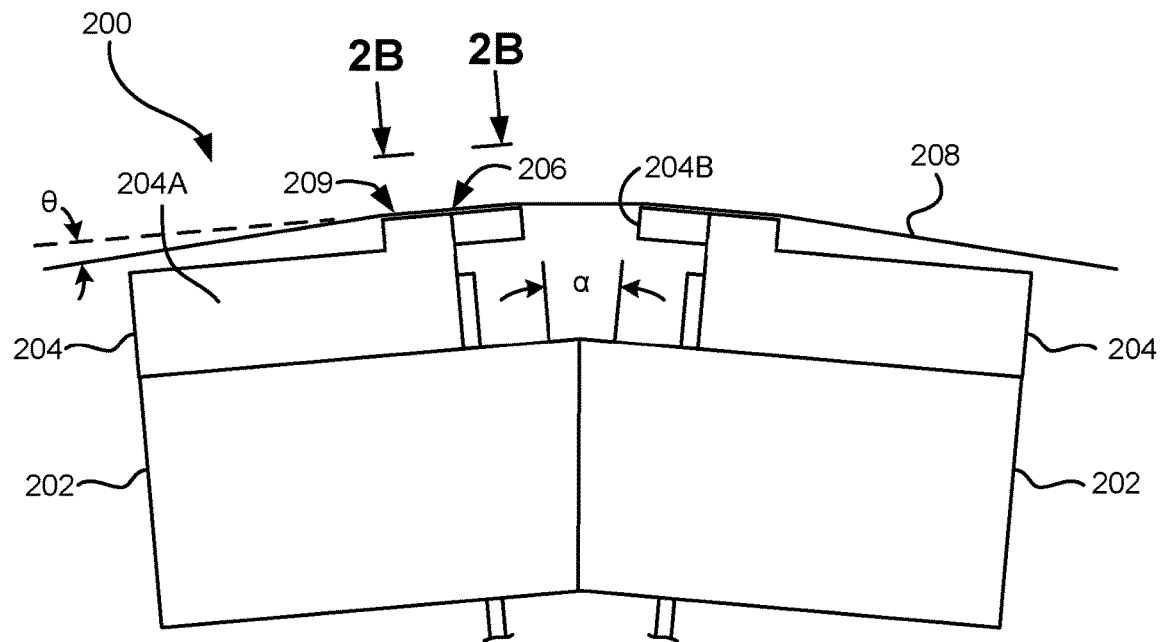
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
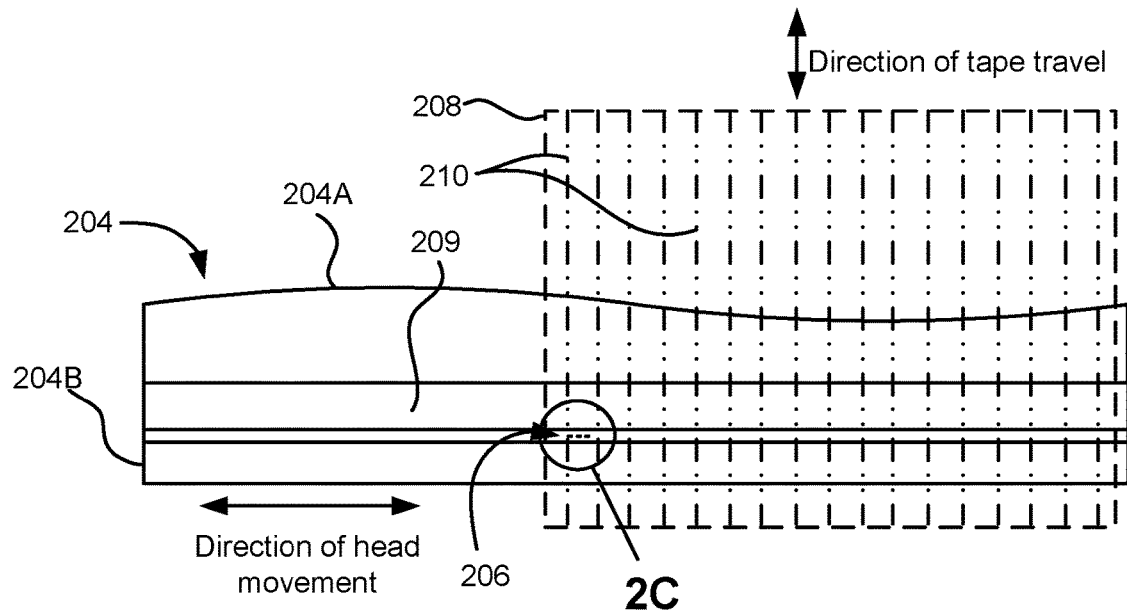
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
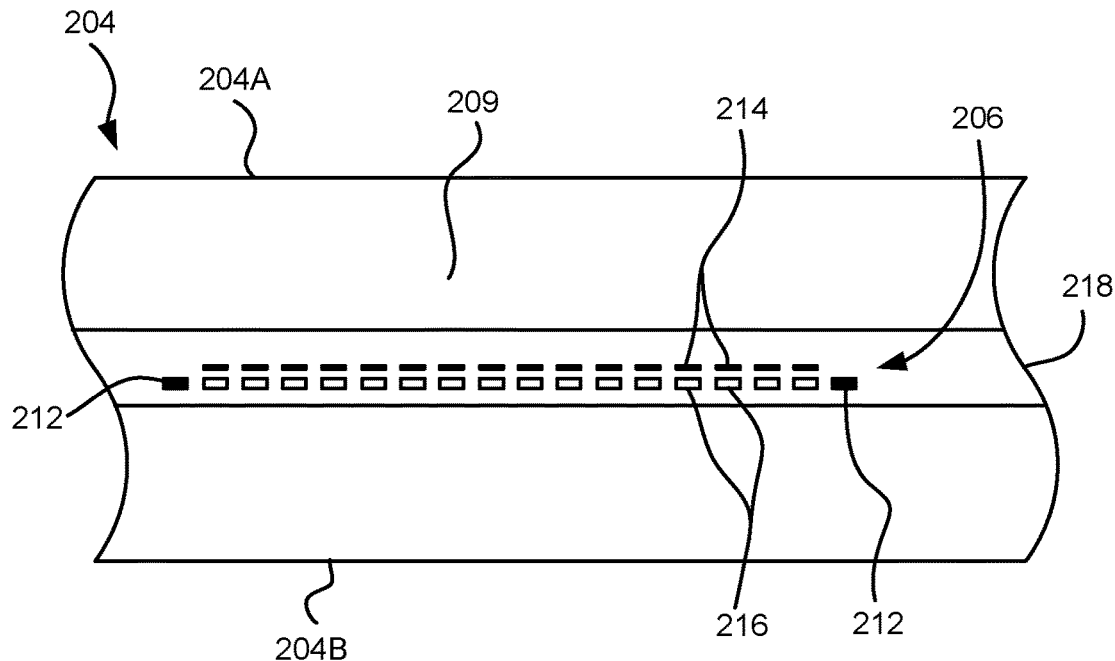
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
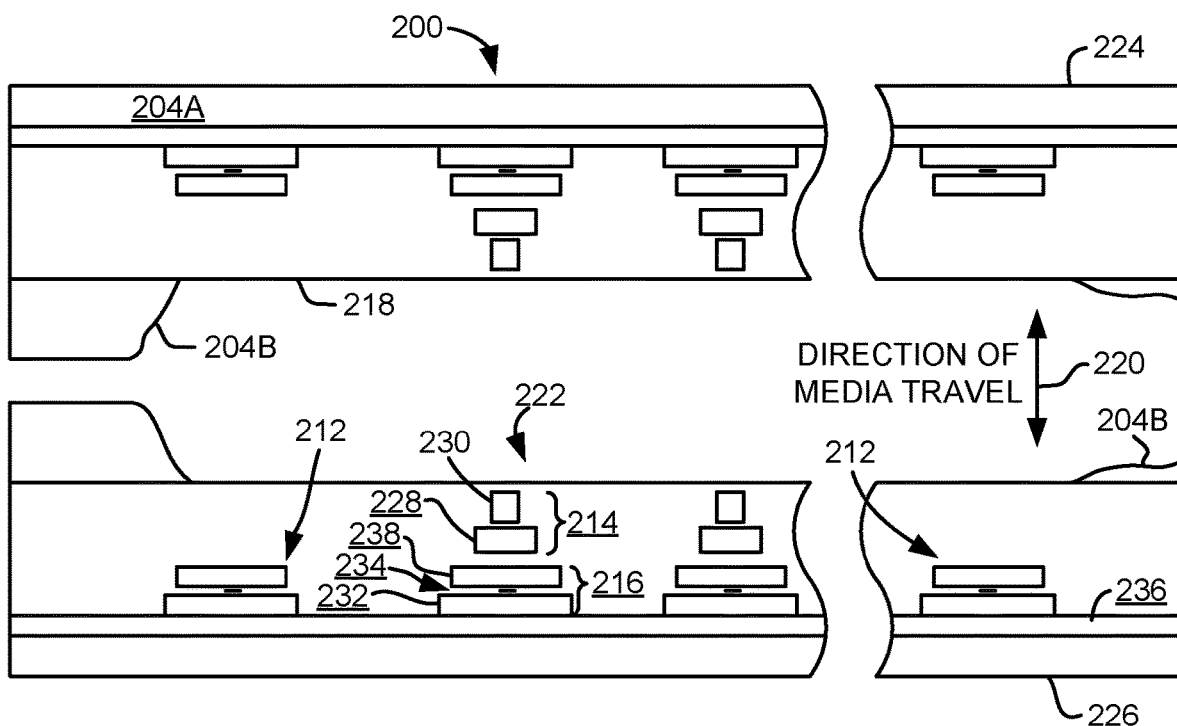
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (−), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
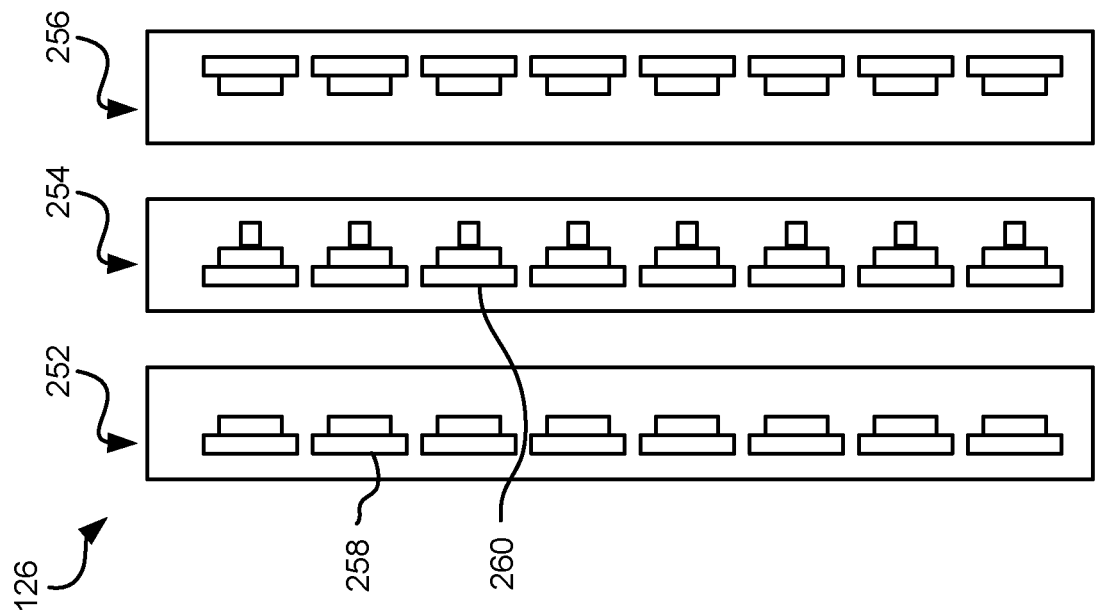
FIG. 4 is a partial tape bearing surface view of a magnetic head having a read-write-read configuration.
Figure 3:
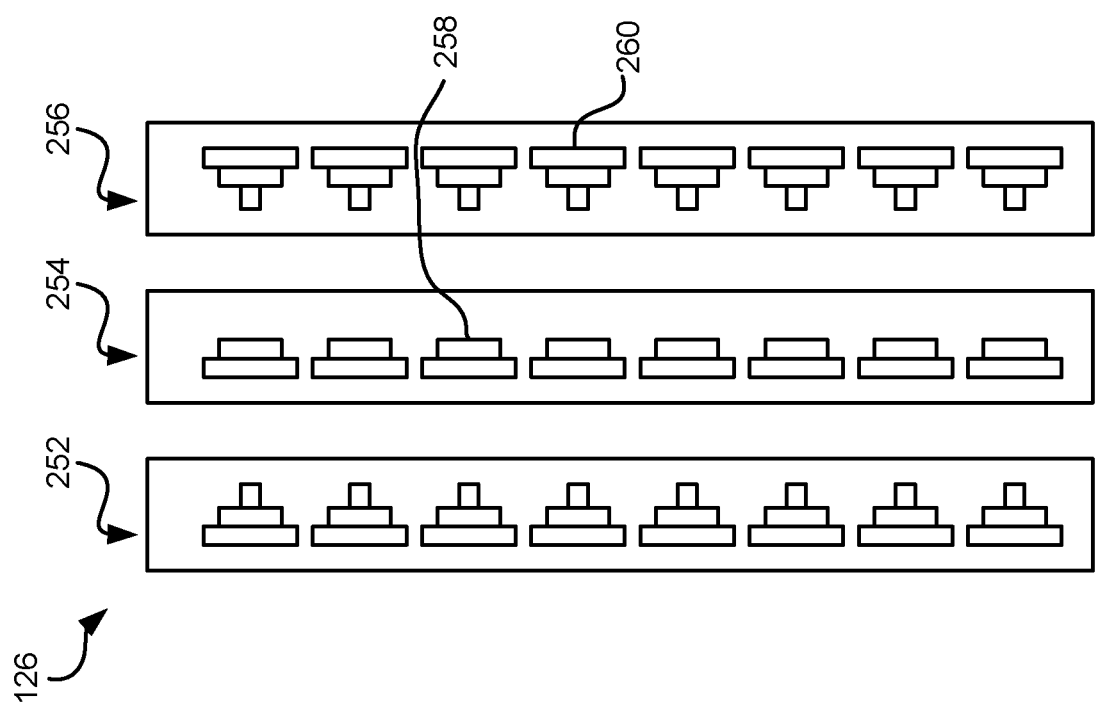
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
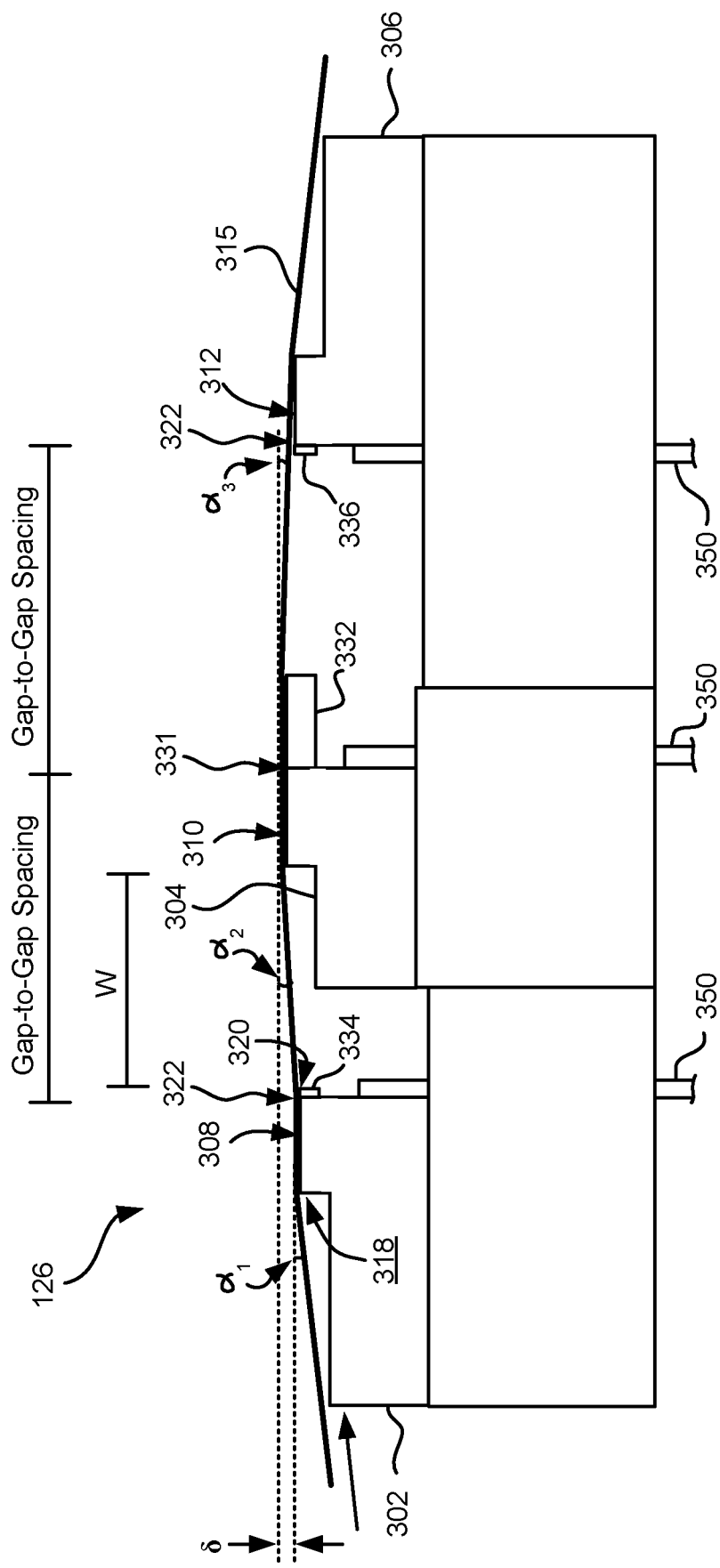
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
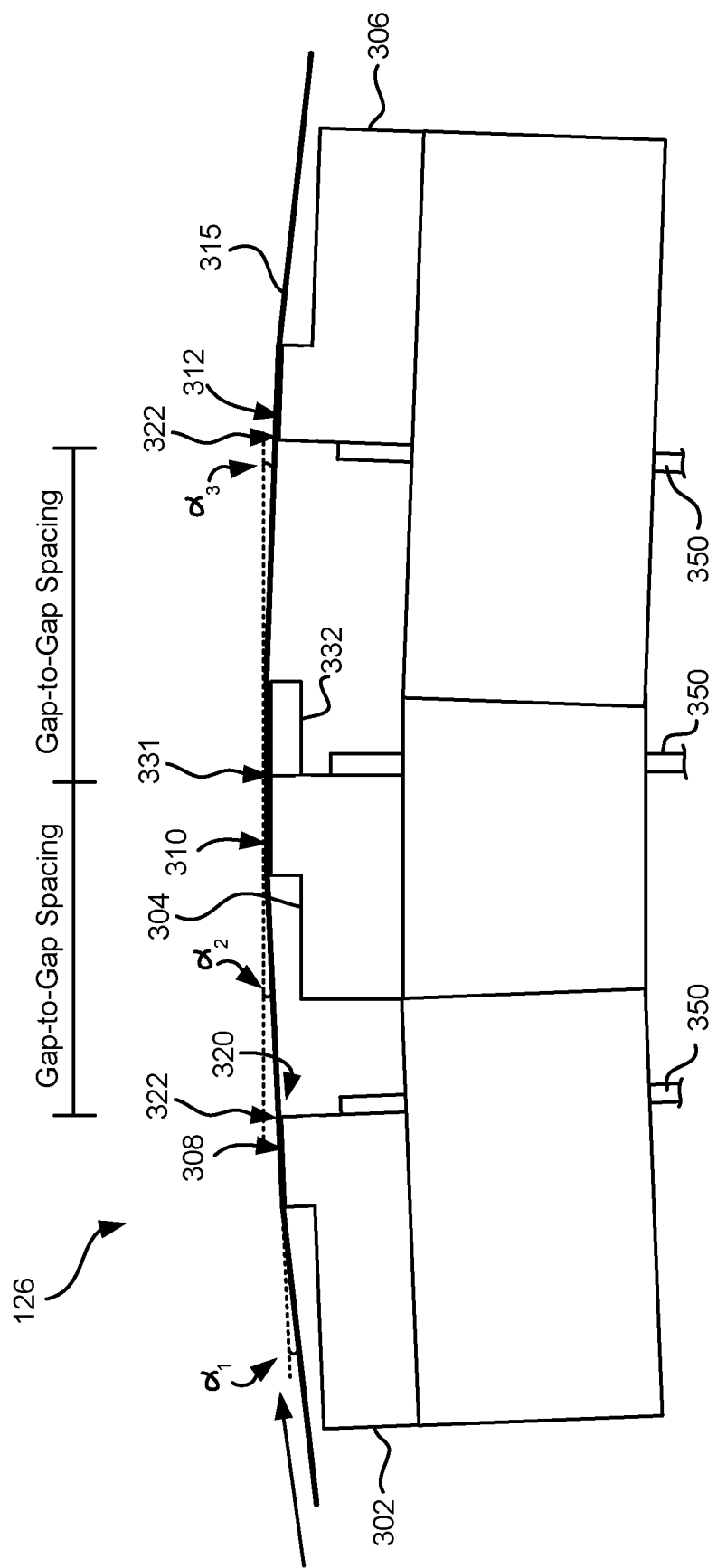
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
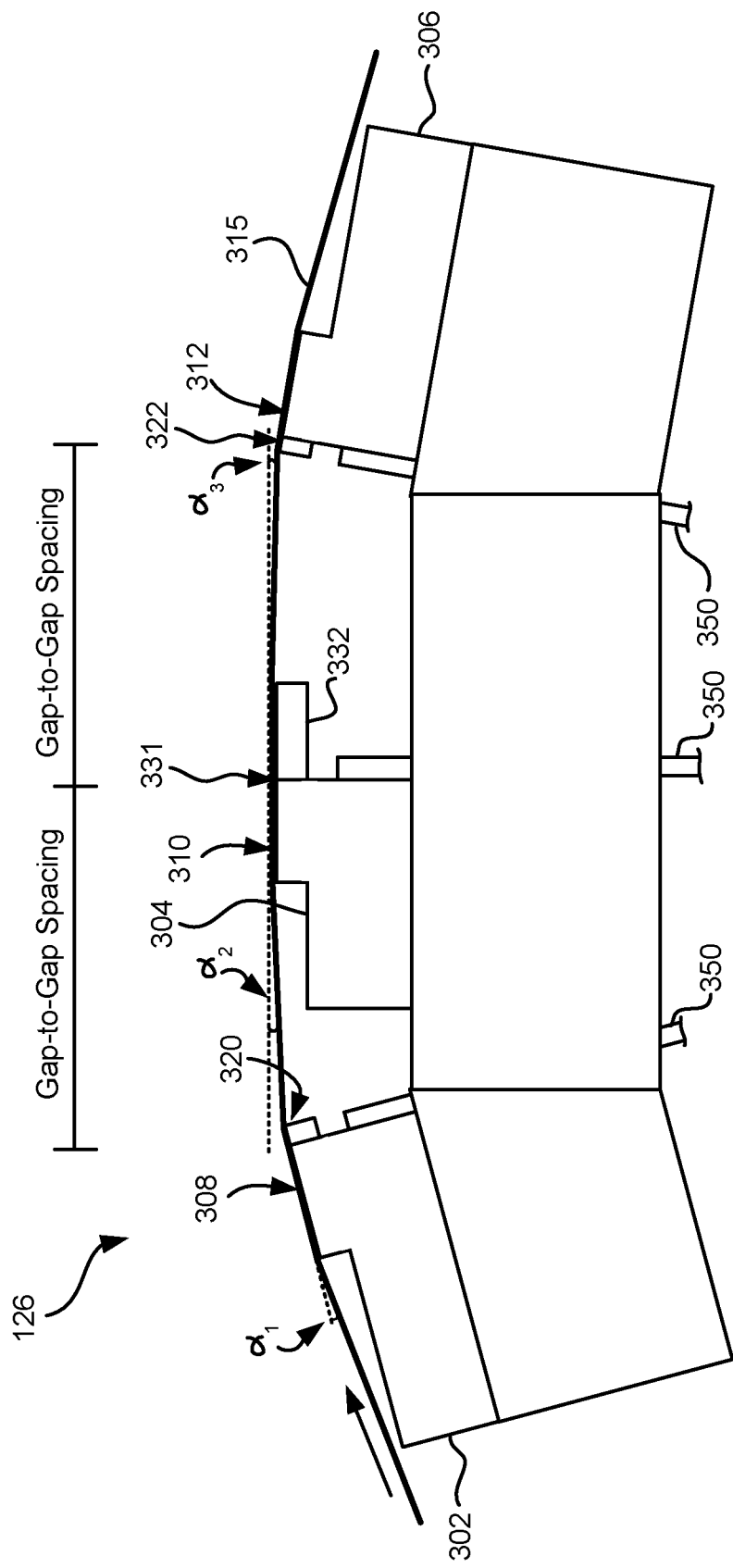
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
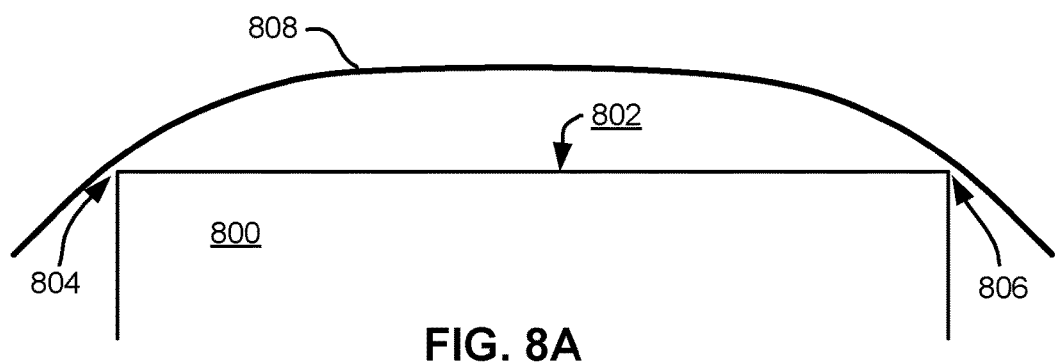
FIGS. 8A-8C are schematics depicting the principles of tape tenting.
Figure 8B:
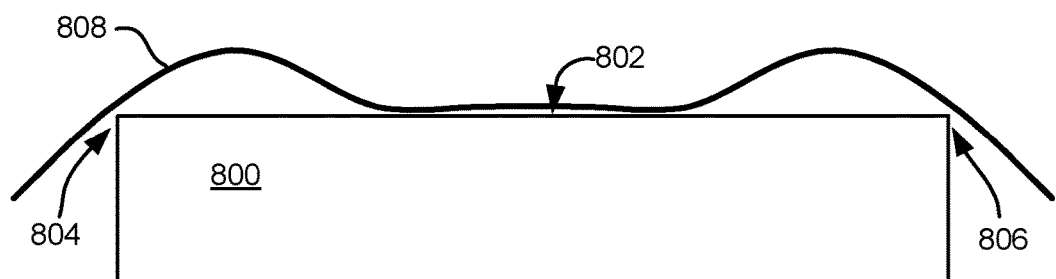
Figure 8C:
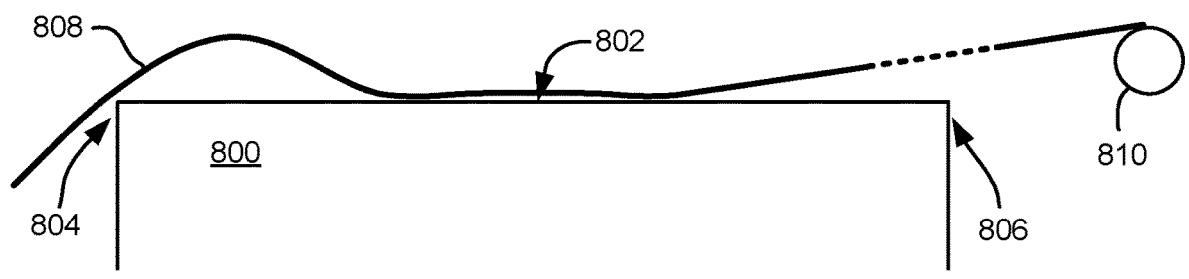

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
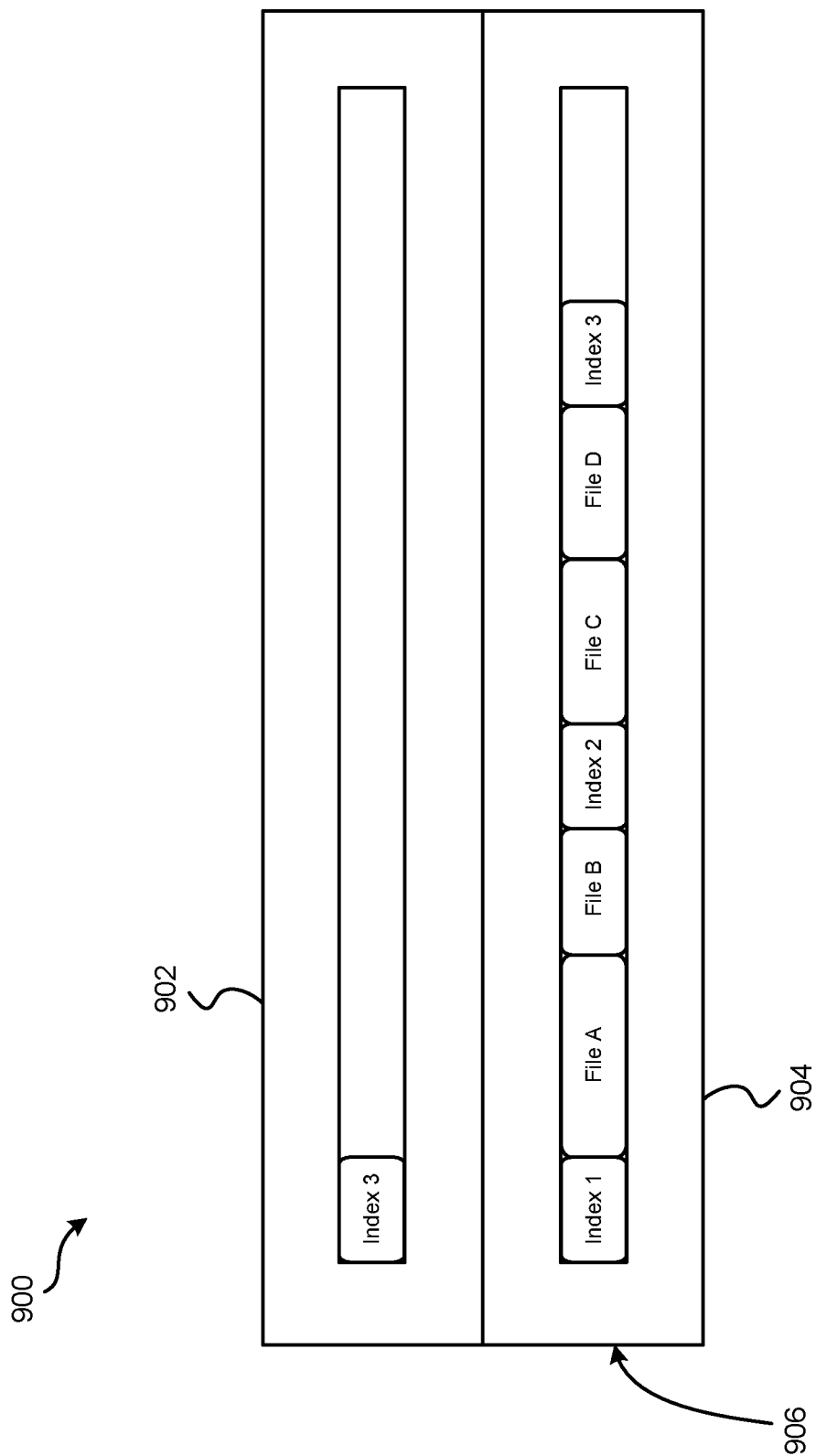
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Future tape media may have smoother surfaces to reduce spacing between the tape head and tape medium.

Various embodiments provide improvements to tape head technology to reduce friction between the tape bearing surface of a tape head module and the magnetic tape medium. For example, some embodiments provide improvements to the tape head module to reduce friction by implementing recessed portions in the tape bearing surface to enable an air bearing to form between the head and tape in the non-functional regions of the tape bearing surface, e.g., portions of the regions not including the transducers. This arrangement reduces friction and may be manufactured with batch processes, providing faster throughput and lower costs of manufacturing the head. Further, forming the recessed portions within the area of the tape bearing surface retains the skiving edges of the module, which is useful for removing debris from the tape medium surface contacting the skiving edges.

Figure 10:
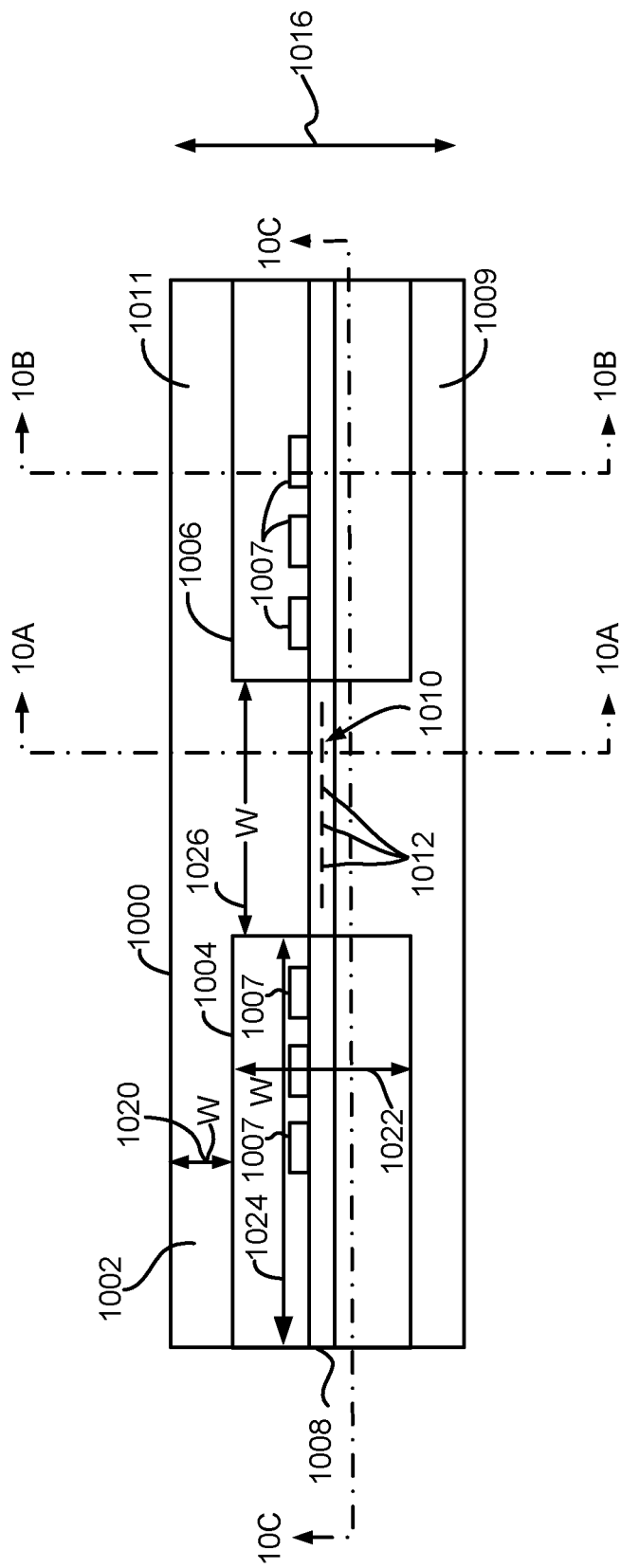
FIG. 10 illustrates an embodiment of a top plan view of a module of the tape head.

FIG. 10 illustrates a top plan view of an embodiment of a module 1000 having a tape bearing surface 1002 with a first recessed portion 1004 and second recessed portion 1006 formed in the tape bearing surface 1002. Such module 1000 may be used as any of the modules described herein, e.g., with reference to the other FIGS.

In the present exemplary embodiment, the module 1000 has a gap 1008 formed on a substrate 1009 between the substrate 1009 and a closure 1011. The gap 1008 may extend the length of the module 1000 or a portion thereof, e.g., when the gap is in a chiplet. An array 1010 of transducers 1012 is present in the gap 1008. The transducers 1012 may include read, write, and/or servo transducers. The transducer array 1010 extends along the tape bearing surface 1002 between the recessed portions 1004 and 1006. A tape medium 1014 (shown in FIG. 10C) moves across the module 1000 in a forward or reverse direction indicated by the arrow 1016.

One or more of the modules of an assembled magnetic head may include the recessed portions 1004, 1006 to cause an air bearing to be formed above the non-functional regions of the module. In certain embodiments, all modules of an assembled magnetic head may include the recessed portions 1004, 1006.

One or more apertures 1007 extending through the module from each recessed portion 1004, 1006 to an opposite side of the module for permitting passage of air through the aperture into the recessed portion. In one approach, only one aperture 1007 is positioned in each recessed portion. In another approach, two apertures are positioned in each recessed portion. In yet another approach, more than two apertures are positioned in each recessed portion. For example, the depicted embodiment includes three apertures 1007 in each recessed portion 1004, 1006.

Forming recessed portion 1004, 1006 in the module results in significantly reduced friction in non-functional regions of the module, e.g., the areas of the module flanking the transducers. The recessed portion 1004, 1006 induce formation of an air bearing between the head and tape along the non-functional regions of the module.

The apertures 1007 further reduce friction by enabling air to flow more easily into the recessed portion 1004, 1006 thereby ensuring that a sufficient air bearing is present when tape is running by providing a short, low resistance air flow path. While the apertures 1007 may be positioned anywhere in the respective recessed portion, preferably at least one aperture 1007 is positioned closer to the array of transducers than the end of the module for providing airflow where it is needed most, because of the airflow impedance along the length of the recessed portion.

By way of example, in certain implementations for use with a ½ inch tape, a closure width 1020 between an edge of the module 1000 and the edge of a recessed portion 1004, 1006, and may be less than about 25 microns (μm) and greater than about 5 μm. A corresponding substrate width between an edge of the module 1000 and the edge of a recessed portion 1004, 1006 may have similar dimensions as the closure width 1020, or may be different therefrom. The width 1022 of the recessed portions 1004, 1006 may be approximately 200 μm wide or less, and the length 1024 may be approximately 4 millimeters (mm) or more. The depth of the recessed portions 1004, 1006 may approximately be greater than 5 μm. The distance 1026 between the recessed portions 1004 and 1006 is greater than a width of the array 1010. In alternative embodiments, different dimensions for these sections may be used.

The length of each aperture 1007 from opening to opening thereof corresponds to the thickness of the closure between the recessed portion and the opposite side of the module. In general, this is typically less than 1000 μm, preferably less than 500 μm, and in some approaches less than 100 μm. The openings of the apertures 1007 may have any practical dimensions, but are ideally dimensioned to provide less air flow resistance to the void in the area of the recessed portion immediately adjacent the aperture than the air flow resistance from the outer end of the recessed portion to the same area. An illustrative sidewall length of each aperture is 50-1000 μm in either dimension. The air flow resistance is determinable via known modeling software using techniques that would become apparent to one skilled in the art upon reading the present disclosure.

Figure 10A:
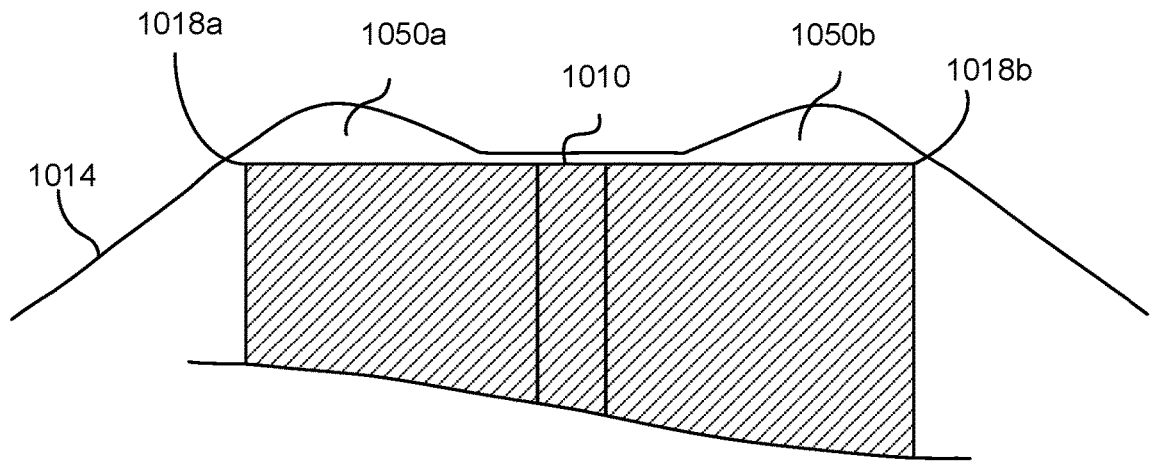
FIGS. 10A and 10B are cross sectional views of the module taken along a plane as shown in FIG. 10.
Figure 10B:
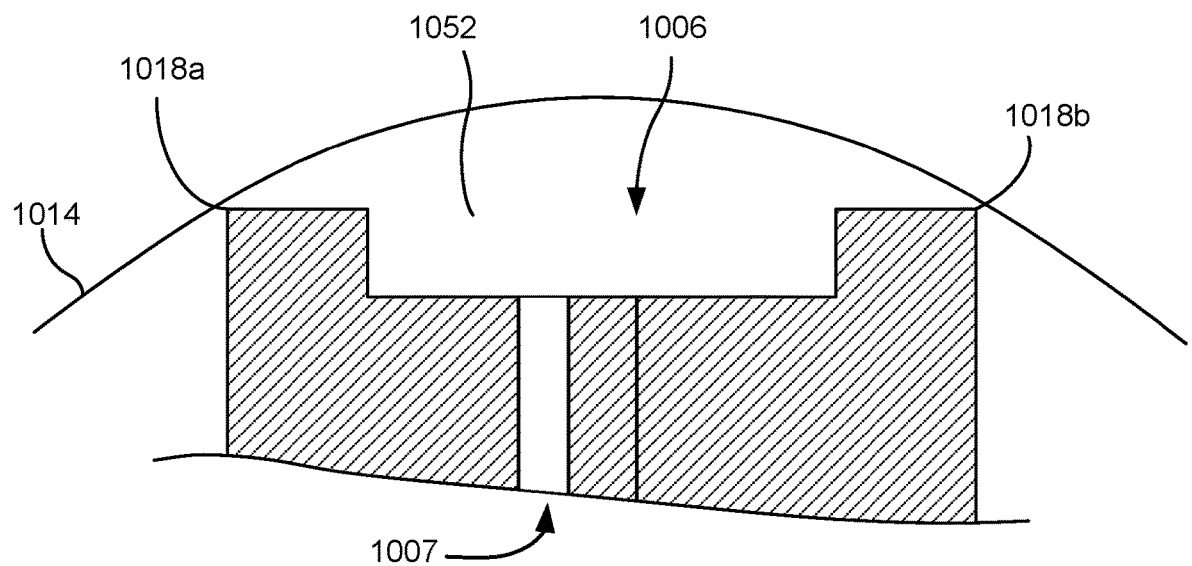

FIGS. 10A and 10B show a cross-section taken along the lines 10A and 10B in FIG. 10, respectively. FIG. 10A shows the cross-section in the transducer array 1010 and shows the tape 1014 which is passing over the transducer array 1010 in close proximity to the transducers 1012 as a result of a vacuum formed between the tape 1014 and the transducer array 1010 due to skiving along a leading one of the skiving edges 1018a, 1018b of the module 1000. Tape tenting 1050a, 1050b is exhibited near the edges 1018a, 1018b.

FIG. 10B shows a cross section along the recessed portion 1006, and shows that while the tape 1014 is passing over the recessed portion 1006, air flows into the recessed portion 1006, thus forming a spacing of air 1052 between the tape 1014 and the tape bearing surface 1002 in the area of the recessed portion 1006. The spacing of air 1052 is formed as a result of the air bearing formed by air flowing into the recessed portion 1006 from the open and as well as the apertures 1007. In this way, running friction is eliminated along most parts of the tape bearing surface 1002 except in the vicinity of the transducer array 1010.

FIGS. 10A and 10B illustrate the sharp skiving edges 1018a, 1018b extending along the tape bearing surface 1002. The tape 1014 comes into contact with the skiving edges 1018a, 1018b, which scrapes debris off the tape 1014 as the tape 1014 passes over the edges 1018a, 1018b, as well as skives off air entrained by the tape 1014. Removing debris from the tape 1014 surface avoids introduction of errors during read and write operations from debris on the tape 1014 surface. Further, when the tape 1014 comes into contact with the skiving edges 1018a, 1018b, tape tenting 1050a, 1050b is exhibited near the transducers as shown in FIG. 10A, but an air bearing in space 1052 is formed along most of the tape bearing surface 1002, including the area over and adjacent to the recessed portions 1004, 1006. This air bearing in space 1052 eliminates friction over most of the tape bearing surface 1002, except in the vicinity of the transducer array 1010 where atmospheric pressure pushes the tape 1014 into near contact with the tape bearing surface 1002 to permit the transducers 1010 to perform read and/or write operations with respect to the tape 1014.

Figure 10C:
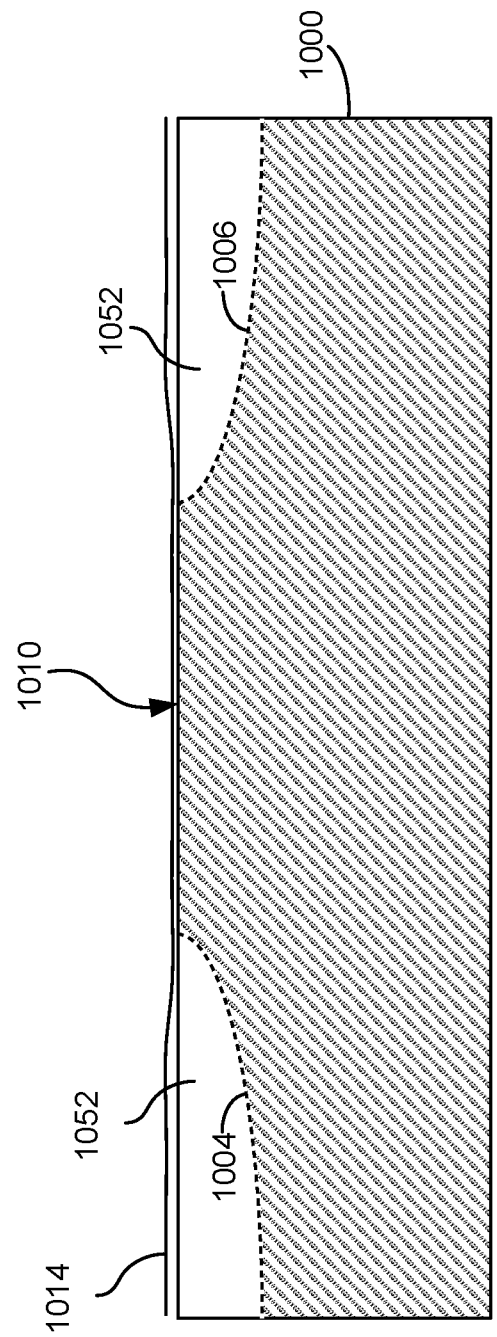
FIG. 10C is a partial cross-sectional view of the module taken along a plane as shown in FIG. 10.

FIG. 10C illustrates a cross section of the module 1000 of FIG. 10, taken along the horizontal length of the module 1000 along a cross section shown in FIG. 10, showing how the tape 1014 passes over the module 1000 with an air bearing in the space 1052 between the tape while the tape 1014 passes over the recessed portions 1004, 1006, also shown in FIG. 10B. The tape 1014 passes over the module 1000 into and out of the page in the view shown in FIG. 10C. A vacuum causes the tape 1014 to come into close proximity with the transducer array 1010 to allow the elements in the transducer array 1010, as shown in FIG. 10A, to perform read, write, and/or servo operations with respect to the tape 1014 medium.

Figure 11:
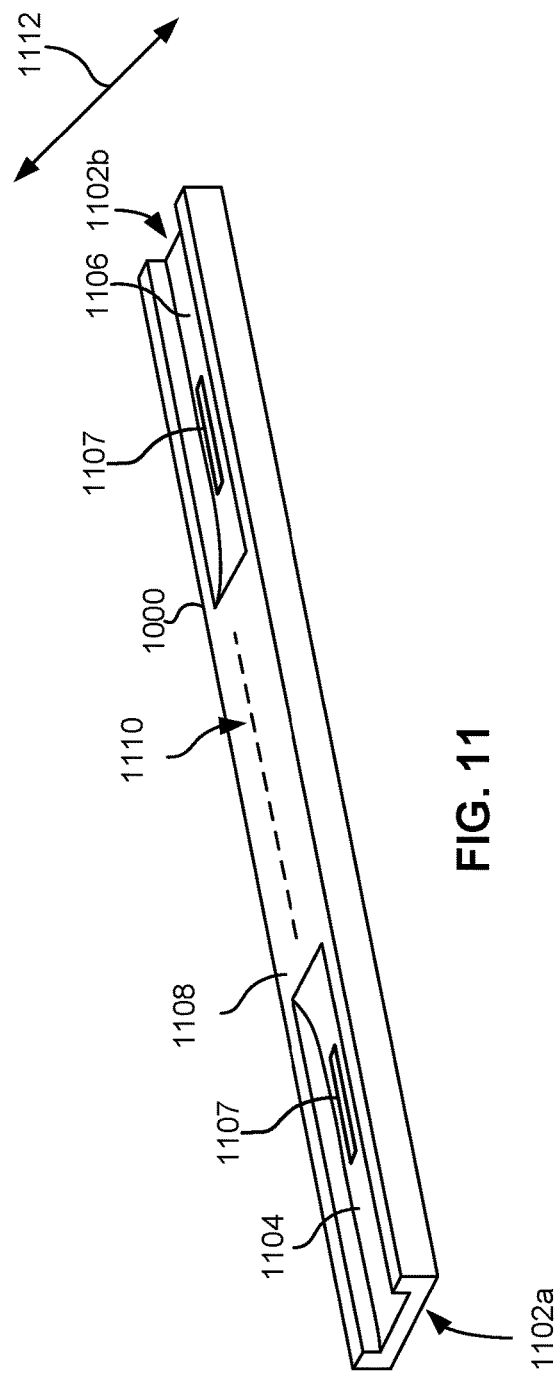
FIGS. 11-12 are perspective views of embodiments of a module of a tape head.
Figure 12:
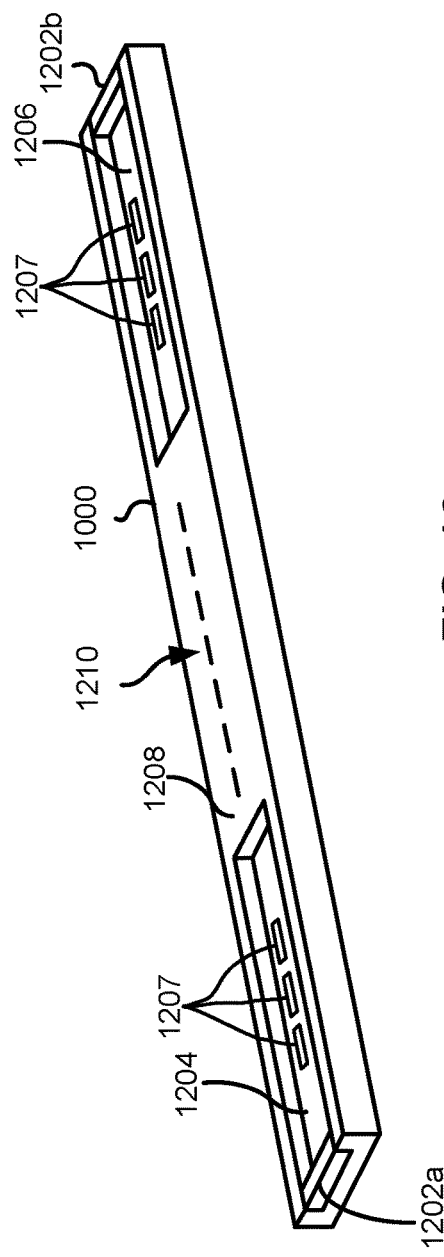

FIGS. 11-12 illustrate different embodiments of the module 1000 of FIG. 10 having different arrangements for the recessed portions. FIG. 11 shows the module 1000 having open sides 1102a, 1102b in the recessed portions 1104, 1106 that allow air to flow directly into the recessed portions 1104, 1106 while the tape 1014 is traversing over a tape bearing surface 1108 in the directions 1112. The transducer array section 1110 includes read, write and/or servo elements to perform read and write operations with respect to the tape medium 1014 moving across the module 1000 in the directions 1112. In FIG. 11, the ends of the recessed portions 1104, 1106 near the transducer array section 1110 may curve upward, depending on the method of fabrication. Also, one larger aperture 1107 is shown in each recessed portion 1104,

1106, though again any number and/or configuration of aperture(s) can be implemented.

FIG. 12 shows the module 1000 having side walls 1202*a*, 1202*b* of the recessed portions 1204, 1206. The transducer array section 1210 includes read, write and/or servo elements to perform read and write operations with respect to the tape medium 1014 moving across the tape bearing surface 1208. Air flows into the recessed portions 1204, 1206 through an area where the tape 1014 scrapes off the edges 1018*a*, 1018*b*, such as the space 1052 shown in FIG. 10C. Further, air flows into a recessed portion 1204, 1206 via the apertures 1207. This air flow into the recessed portions 1204, 1206 allows an air bearing and space 1052 (FIG. 10C) to form between the tape 1014 and tape bearing surface 1208 along most of the length of the tape bearing surface 1208. In FIG. 12, the ends of the recessed portions 1204, 1206 near the transducer array section 1210 may form a wall orthogonal with respect to the bottom of the recessed portions 1204, 1206, may be sloped as in FIG. 11, etc.

Described embodiments provide tape head modules with recessed portions formed on each side of the transducer array elements to allow air to flow into the module to form an air bearing between the tape medium and the non-functional regions of the tape bearing surface. Further, with described embodiments, the edges of the module are retained to allow for skiving of debris from the tape medium as the tape traverses the modules.

Further embodiments provide techniques to form the recessed portions in the tape bearing surface of the tape head modules.

Figure 13:
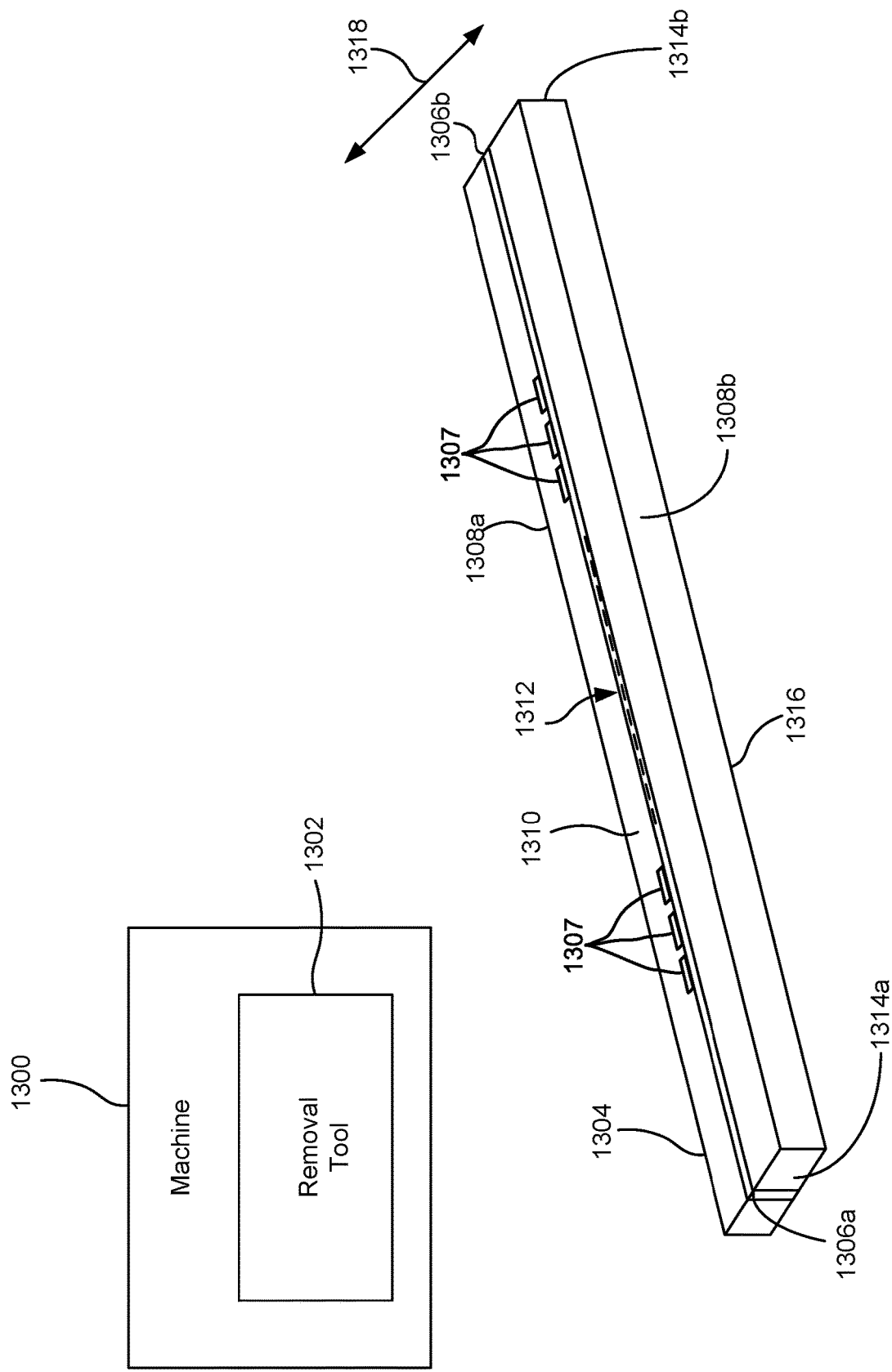
FIG. 13 illustrates an embodiment of a machine tool for forming recessed portions in a tape head module.

FIG. 13 provides an embodiment of a machine 1300 having a removal tool 1302 to remove material from a tape head module 1304 to form the recessed portions shown in the embodiments of FIGS. 10-12. The machine 1300 may comprise a cutting system and the removal tool 1302 a dicing saw suitable for cutting silicon, gallium arsenide, glass, ceramics, etc. An example of a suitable cutting system comprises Manufacturing Technology Inc.'s NSX-250 Dicing Saw. In alternative embodiments, the removal tool 1302 may comprise other types of saws suitable for removing material from a tape head module, such as an air spindle saw. In further embodiments, the machine 1300 may comprise an ion-milling machine and the removal tool 1302 a wide beam ion source that accelerates ions of an inert gas onto the tape bearing surface of the module 1304 to etch away material to form the recessed portions. In a further embodiment, the machine 1300 may comprise a Reactive Ion Etching (RIE) machine. In yet further embodiments, other suitable machines and removal tools for removing material from a silicon wafer may be used.

The module 1304 has a first end 1306*a*, a second end 1306*b*, a first side 1308*a*, a second side 1308*b*, a tape bearing surface 1310 and a surface 1316 opposite the tape bearing surface. A region of an array of transducers 1312 is also formed on the module 1304. A tape medium travers the module 1304 in the directions 1318.

The module 1304 also includes apertures 1307 therethrough. The apertures may be formed by any suitable method. In one approach, the apertures 1307 are formed by forming channels on the closure before the closure is adhered to the remaining portion of the module. In another approach, the apertures 1307 are formed by machining, e.g., drilling, before or after formation of the recessed portions. In yet another approach, the apertures 1307 are formed by etching, e.g., milling, before or after formation of the recessed portions. In yet another approach, the apertures 1307 are formed by laser ablation before or after formation of the recessed portions.

The machine 1300 may be programmed to operate the removal tool 1302 to remove material from the tape bearing surface 1310 to form the recessed portions. In further embodiments, the machine 1300 and removal tool 1302 may be machine controlled by a person or robot at a control panel of the machine 1300.

Figure 14:
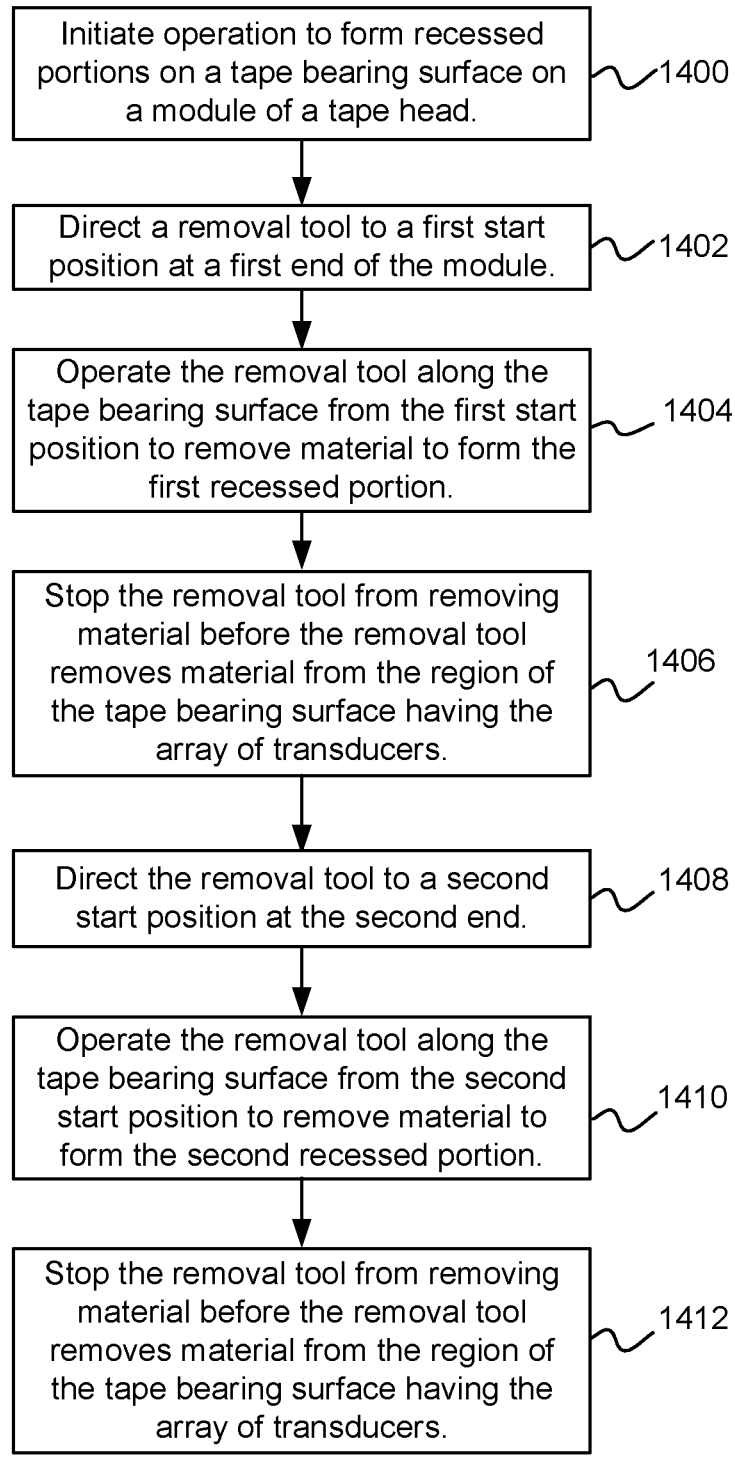
FIG. 14 is a flowchart of a process to form recessed portions on a tape bearing surface of a tape head module.

FIG. 14 is an embodiment of operations performed by the machine 1300 to form the recessed portions, such as recessed portions 1004, 1006 (FIGS. 10, 10C), 1104, 1106 (FIG. 11), 1204, 1206 (FIG. 12), on the tape bearing surface 1310. Upon initiating (at block 1400) the operation to form the recessed portions, the machine 1300 directs (at block 1402) the removal tool 1302, such as a saw or ion source, to a first start position at a first end 1306*a* of the module 1304, which has a substrate and a closure having channels that form apertures. The machine 1300 operates (at block 1404) the removal tool 1302 along the tape bearing surface 1310 from the first end 1306*a* to remove material to form the first recessed portion. The removal tool 1302 is stopped (at block 1406) from removing material before the removal tool removes material from the region of the tape bearing surface having the array of transducers 1312. The machine 1300 further directs (at block 1408) the removal tool 1302 to a second start position at the second end 1306*b* and operates (at block 1410) the removal tool 1302 along the tape bearing surface 1310 from the second start position to remove material to form the second recessed portion. The machine 1300 stops (at block 1412) the removal tool 1302 from removing material before the removal tool 1302 removes material from the region of the tape bearing surface having the array of transducers 1312.

In one embodiment, the removal tool 1302 may comprise an ion milling tool to remove material by etching the tape bearing surface 1310 to form the recessed portions. Alternatively, the removal tool 1302 may comprise a saw that cuts material from the tape bearing surface 1310 to form the recessed portions. In one embodiment, the start positions may be at the first and second ends 1306*a*, 1306*b* external to the module so that the removal tool 1302 removes material from a first side wall 1314*a* at the first end 1306*a* and a second side wall 1314*b* at the second end 1306*b* to form the recessed portions 1104 and 1106 in FIG. 11 where material from the side walls is removed to form openings open to a space external to the module 1304. In an alternative embodiment, the start positions may start at an offset on the tape bearing surface 1310 from the ends 1306*a*, 1306*b*. In such case, the side walls 1202*a*, 1202*b* would be left intact as shown in FIG. 12.

Figure 15:
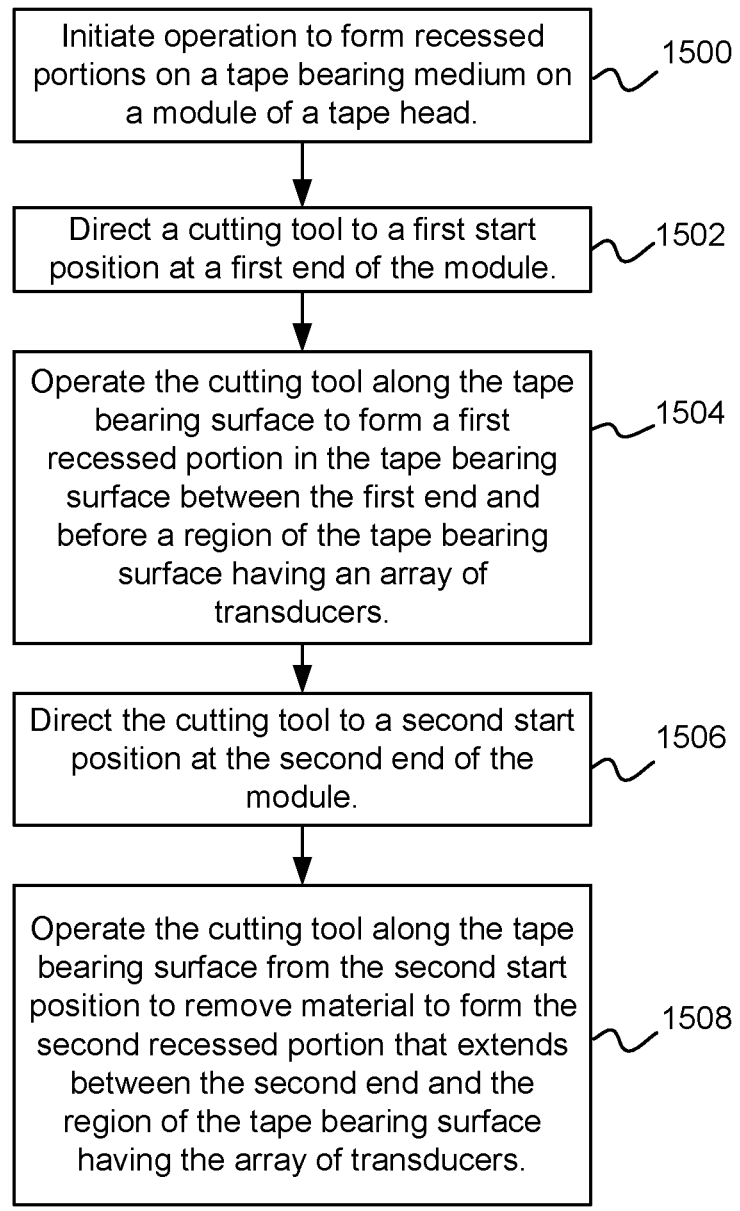
FIG. 15 is a flowchart of a process using a cutting tool to form apertures in the tape head module.

FIG. 15 illustrates an embodiment of operations performed by the machine 1300 to form the recessed portions, such as recessed portions 1004, 1006 (FIGS. 10, 10C), 1104, 1106 (FIG. 11), 1204, 1206 (FIG. 12), on the tape bearing surface 1310 when the removal tool 1302 comprises a saw, such as a dicing saw. Upon initiating (at block 1500) the operations to form the recessed portions, the machine 1300 directs (at block 1502) the removal tool 1302 comprising a cutting tool to a first start position at a first end 1306*a* of the module 1304 and operates (at block 1504) the removal tool 1302 along the tape bearing surface 1310 to form a first recessed portion in the tape bearing surface between the first end and before a region of the tape bearing surface having an array of transducers. The machine 1300 directs (at block 1506) the cutting tool to a second start position at the second end 1306*b* of the module 1304 and operates (at block 1508)

the removal tool 1302 along the tape bearing surface 1310 from the second start position to remove material to form the second recessed portion that extends between the second end 1306b and the region of the tape bearing surface having the array of transducers 1312.

If the removal tool 1302 start positions are located external to the module, then the first and second recessed portions 1104, 1106 are formed as shown in FIG. 11 having openings 1102a, 1102b to a space external to the module 1000. However, if the start positions are located on the tape bearing surface 1310, such as an offset away from the ends 1306a, 1306b, then the recessed portions 1204, 1206 may be formed as shown in FIG. 12 with the side wall 1202a, 1202b retained.

In one embodiment, the removal tool 1302 may be a dicing saw having a width equivalent to a width of the first and the second recessed portions. Further, the removal tool 1302 may operate by performing a plunge cut where the removal tool 1302 or dicing saw is placed in the middle of the recessed portions 1104, 1106 (FIG. 11) and 1204, 1206 (FIG. 12) to be formed. In alternative embodiments, other cutting techniques may be used, such as, but not limited to, ion milling and reactive ion etching.

Referring again to FIG. 13, some embodiments may include modules that have the apertures 1307, but do not have the recessed portions. The apertures 1307 assist in formation of an air bearing between the tape and the module.

In some embodiments, friction is reduced by reducing the tape bearing surface area and by contouring the non-functional portions of the tape bearing surface, e.g., those portions not including the transducer elements, by using diamond lapping to bevel the surface. The beveling may remove material from the edges of the module to help create an air bearing.

Figure 30:
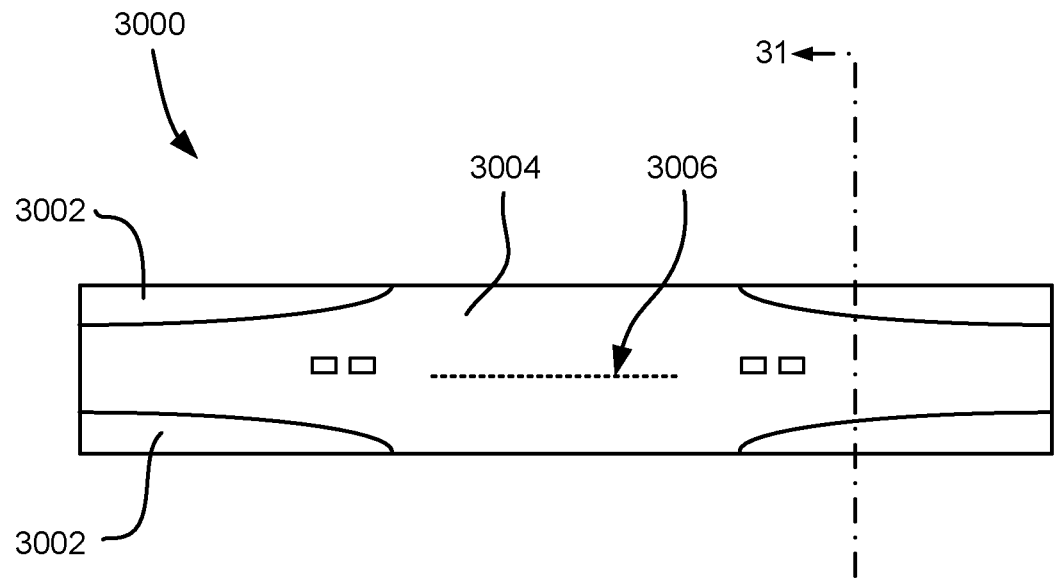
FIG. 30 is a top down view of a module having beveled edges according to one embodiment.
Figure 31:
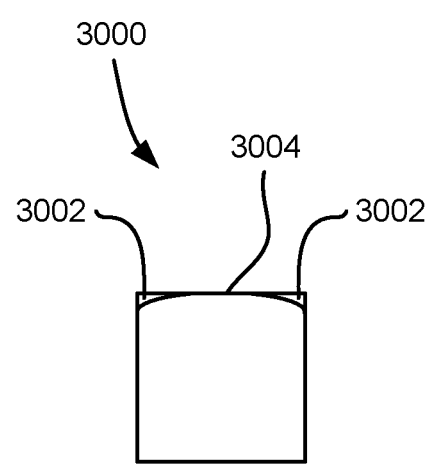
FIG. 31 is a cross sectional view taken along line 30 of FIG. 30.

FIGS. 30 and 31 depict an embodiment of a beveled module 3000 that is similar to the module of FIG. 13, but that has friction-reducing beveled edges 3002 toward opposite ends thereof. The central portion 3004 adjacent the transducers 3006 has a skiving edge extending between the beveled edges 3002. The beveled edges 3002 reduce running friction between the tape and module, and the apertures allow air to enter the space between the tape and module.

Figure 16:
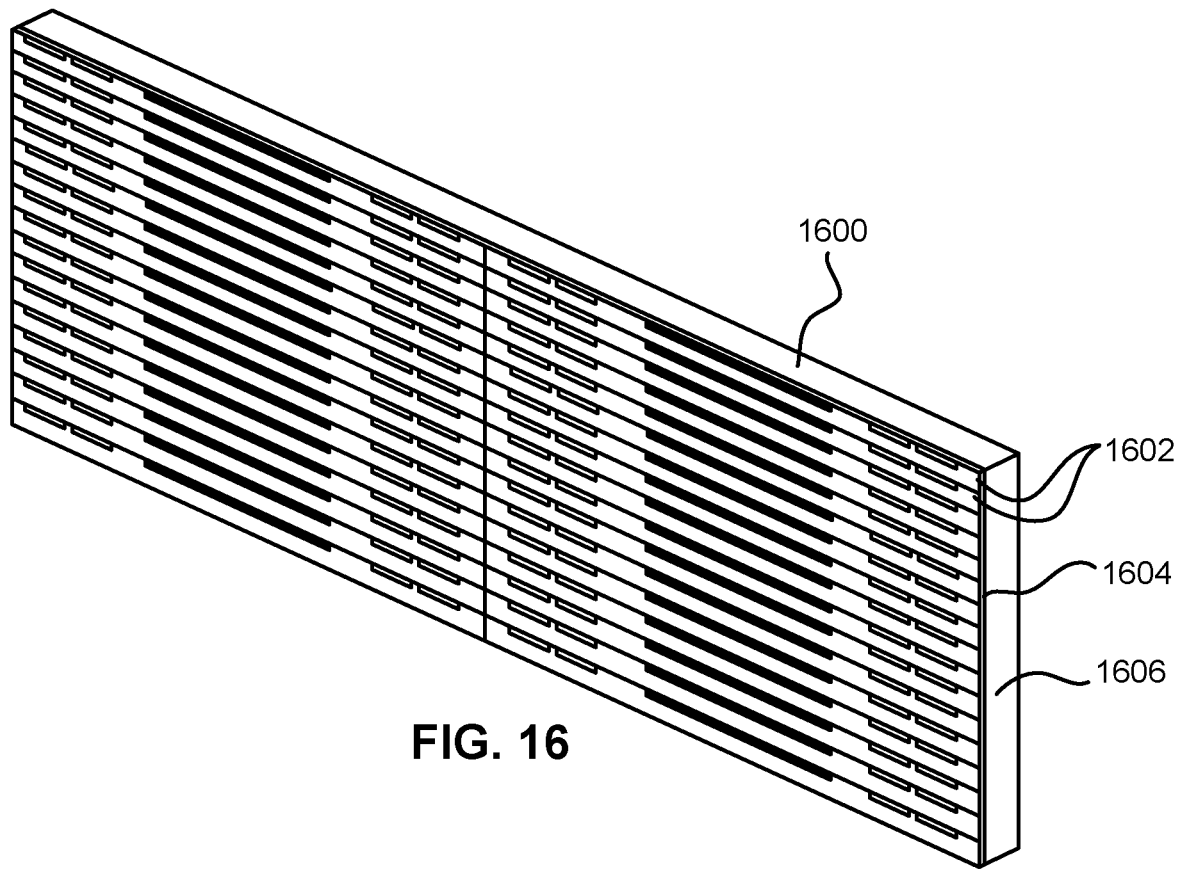
FIG. 16 is a perspective view of a section of a thin film wafer according to one embodiment.

According to the preferred method for forming a module having recessed portions and apertures therethrough, a wafer containing multiple "chips" each having read and/or write circuitry is formed by traditional thin film processing. The thin film wafer is cut into rectangular sections. FIG. 16 illustrates a section 1600 of a thin film wafer according to one embodiment. As shown, the section 1600 includes a plurality of rows 1602 of circuitry formed in a layer 1604 of thin films formed on a substrate 1606. The section 1600 will eventually be sliced and cut to form a head or chip. The circuitry may include, for example, read transducers, write transducers, servo transducers, electronic lapping guides, etc. Each row 1602 may contain multiple head images. Thus, while each row contains two head images in this figure, rows built according to various embodiments may have more or less than two head images.

Figure 17:
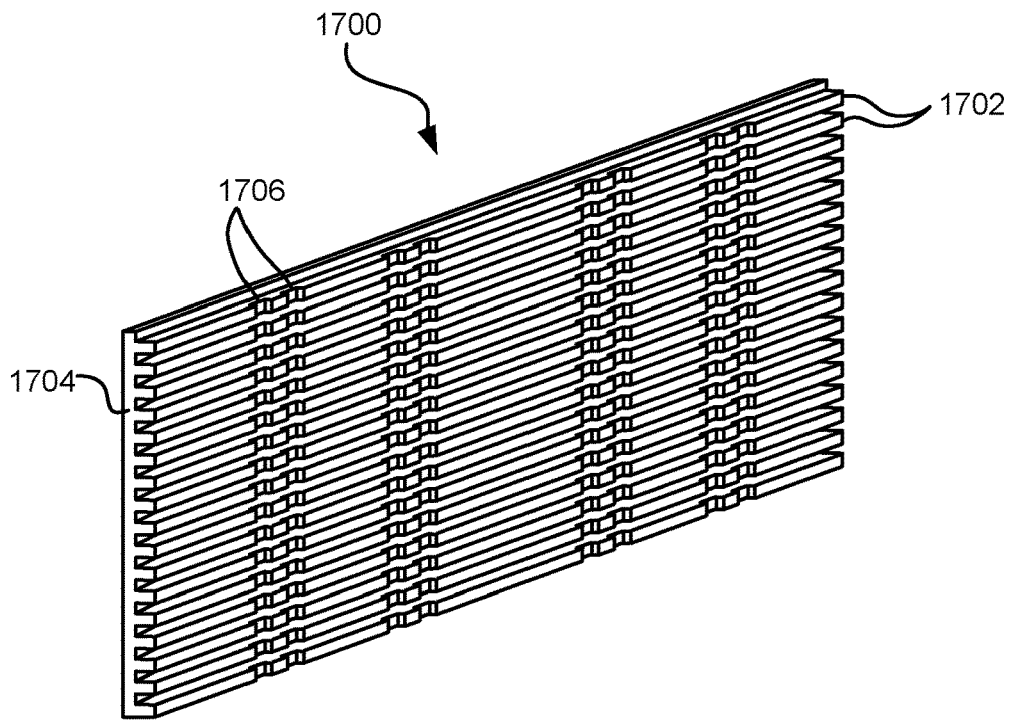
FIG. 17 is a perspective view of an array of closures.

FIG. 17 shows an array 1700 of closures 1702 that will be bonded to a section 1600 of the wafer. The closures 1702 may be of conventional construction. Channels 1706 are formed in each closure 1702, e.g., by grinding with a diamond wheel, or by other known methods. The channels 1706 will become the apertures through the module when the closures are adhered to the section 1600 of FIG. 16. As shown, the closures 1702 in this example extend from a top portion 1704.

Figure 18:
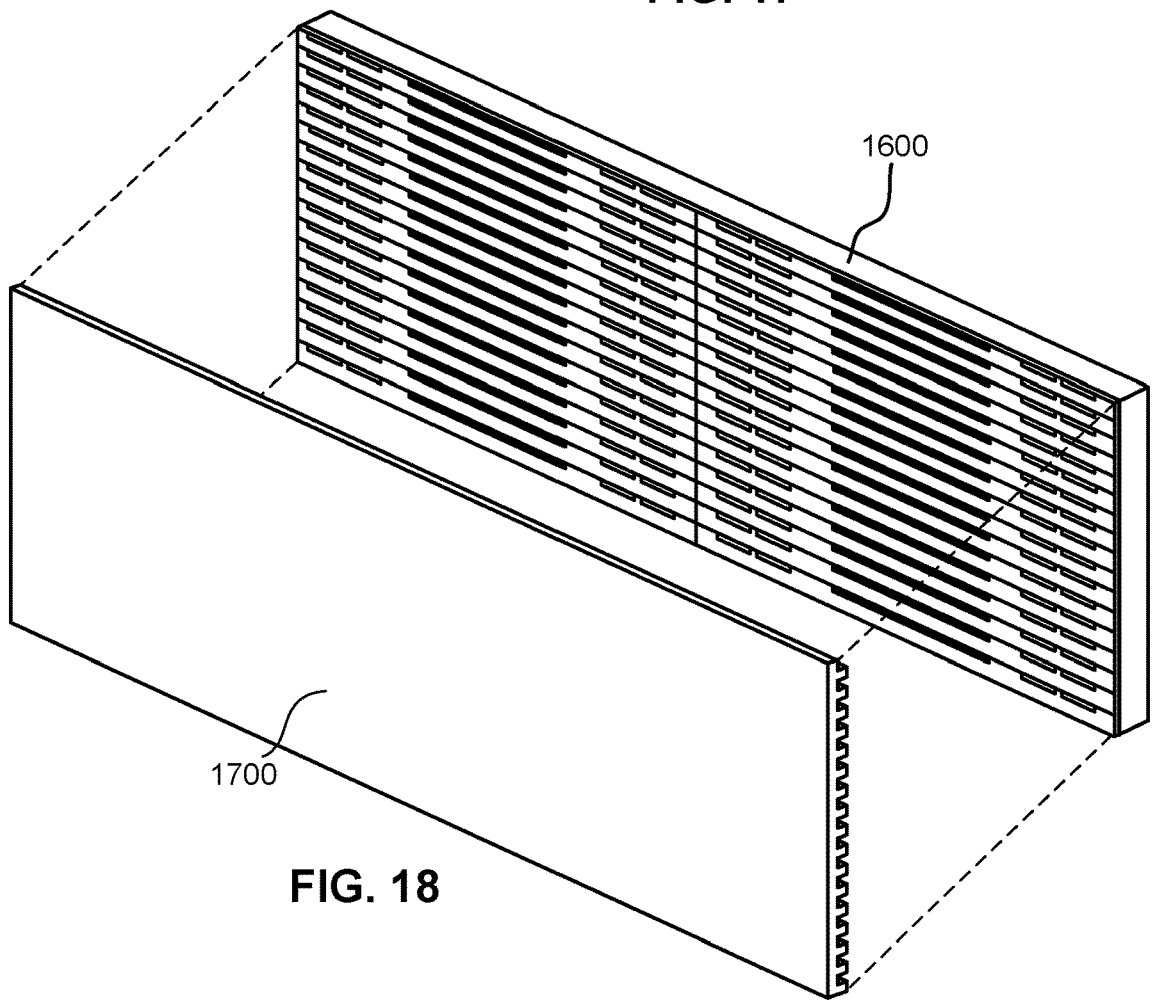
FIG. 18 is a perspective view depicting coupling of the array of closures to the section of wafer.

FIG. 18 illustrates how the array 1700 is bonded to a section 1600. A conventional adhesive may be used to bond the array 1700 to the section 1600.

Figure 19:
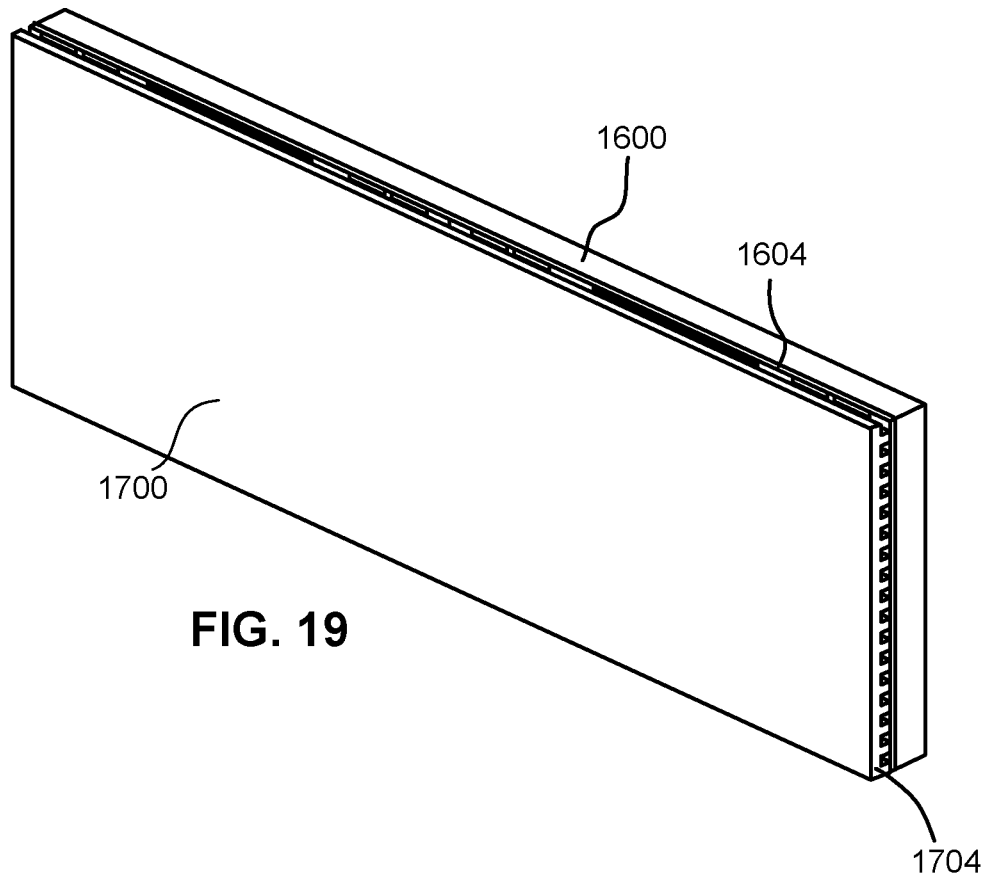
FIG. 19 is a perspective view of the array of closures coupled to the section of wafer.

FIG. 19 depicts the array 1700 of closures 1702 bonded to the section 1600 of wafer. The top portion 1704 of the array 1700 of closures 1702 may be removed prior to slicing the section 1600 into rows 1602. Portions of the closures 1702 themselves may be removed as well to define the length of the tape bearing surface of each closure 1702. Grinding, lapping, and/or other subtractive process may be used.

Figure 20:
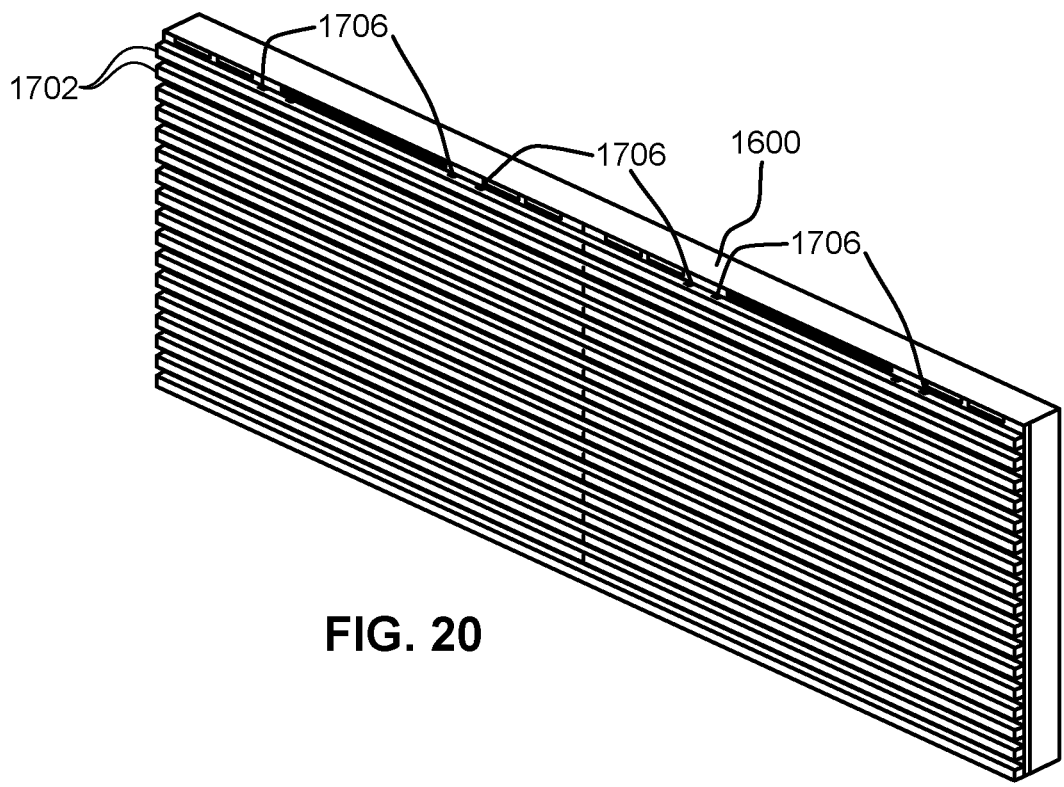
FIG. 20 is a perspective view of the closures coupled to the section of wafer upon removing a top portion of the array of closures.

FIG. 20 shows the closures 1702 and section 1600 with the top portion 1704 of the array of closures 1702 removed. The portions of the closure 1702 remaining after processing support the tape as the tape passes over the head to protect the delicate electronics in the head from wear.

Figure 21:
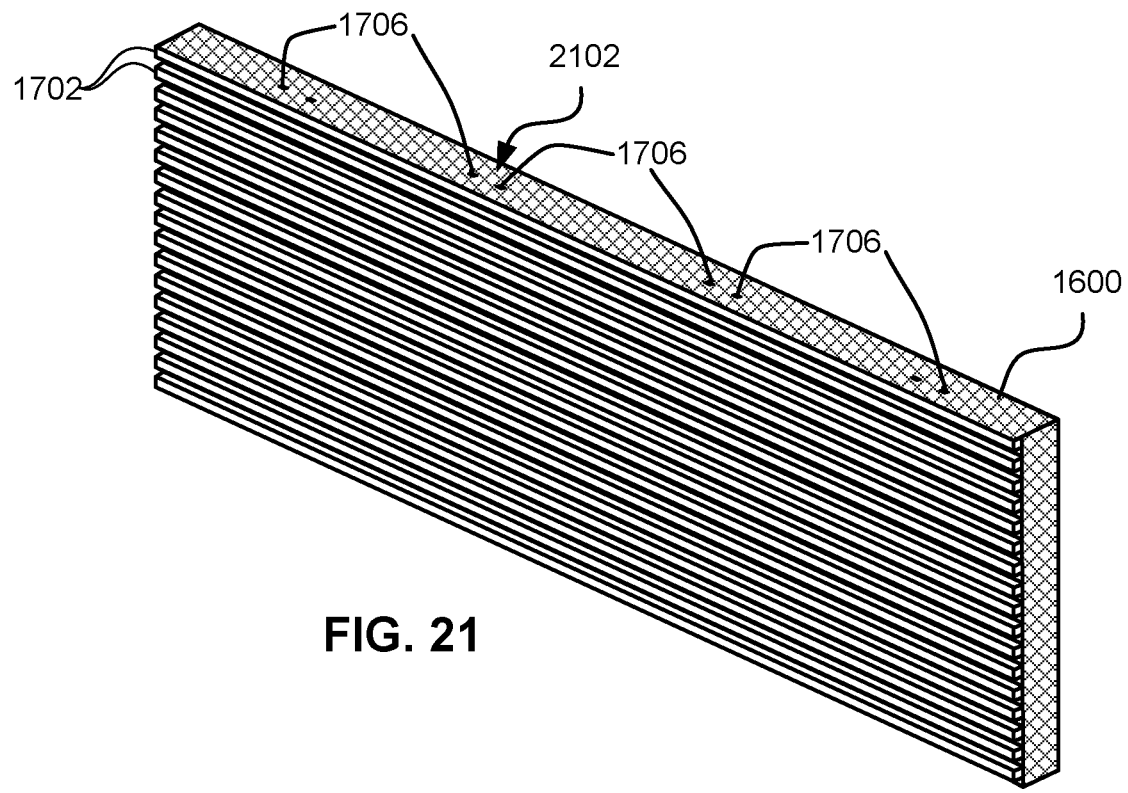
FIG. 21 is a perspective view of the section of wafer of FIG. 20 in an inverted position.

FIG. 21 shows the section 1600 of FIG. 20 inverted from the orientation shown in FIG. 20. The surface of the end 2102 is rough from the processing step in which the section is cut from the wafer, e.g., where a cutting blade is used to cut the section 1600 from the wafer. All surfaces of peripheral ends of the section 1600 and closures 1702 typically have a similar roughness from the cutting step. In FIG. 21, a texture has been added to the drawing to exemplify the roughness of the surfaces of the section 1600.

Figure 22:
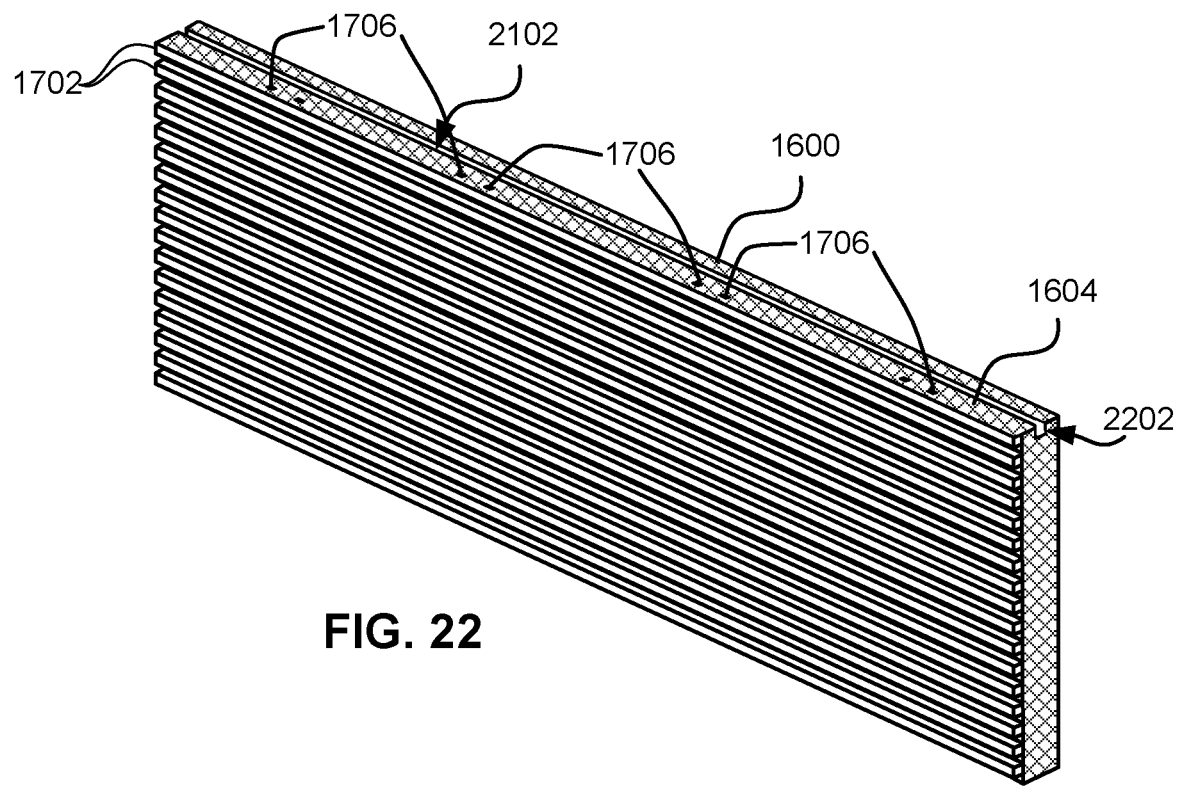
FIG. 22 is a perspective view of the section of wafer of FIG. 21 upon formation of a bearing surface slot in an end thereof.

A bearing surface slot is formed at a precise location in the polished end. FIG. 22 illustrates the section 1600 having a bearing surface slot 2202 formed in the end 2102 thereof. The bearing surface slot 2202 ultimately defines a tape bearing surface 2304 (FIG. 23) between the bearing surface slot and the thin film layer 1604.

Any conventional mechanism for forming the bearing surface slot may be used. For example, a conventional air bearing spindle saw with machine vision may be used to create the bearing surface slot at the proper location.

The depth of the bearing surface slot 2202 is preferably less than about 3 times a width thereof in a tape travel direction. This helps maintain the integrity of the resulting module. The width of the bearing surface slot is not as important, and generally depends on the width of the blade use to cut the bearing surface slot. For example, the depth of the bearing surface slot may be about 10 to about 20 microns deep, but could be higher or lower depending on the embodiment.

Figure 23:
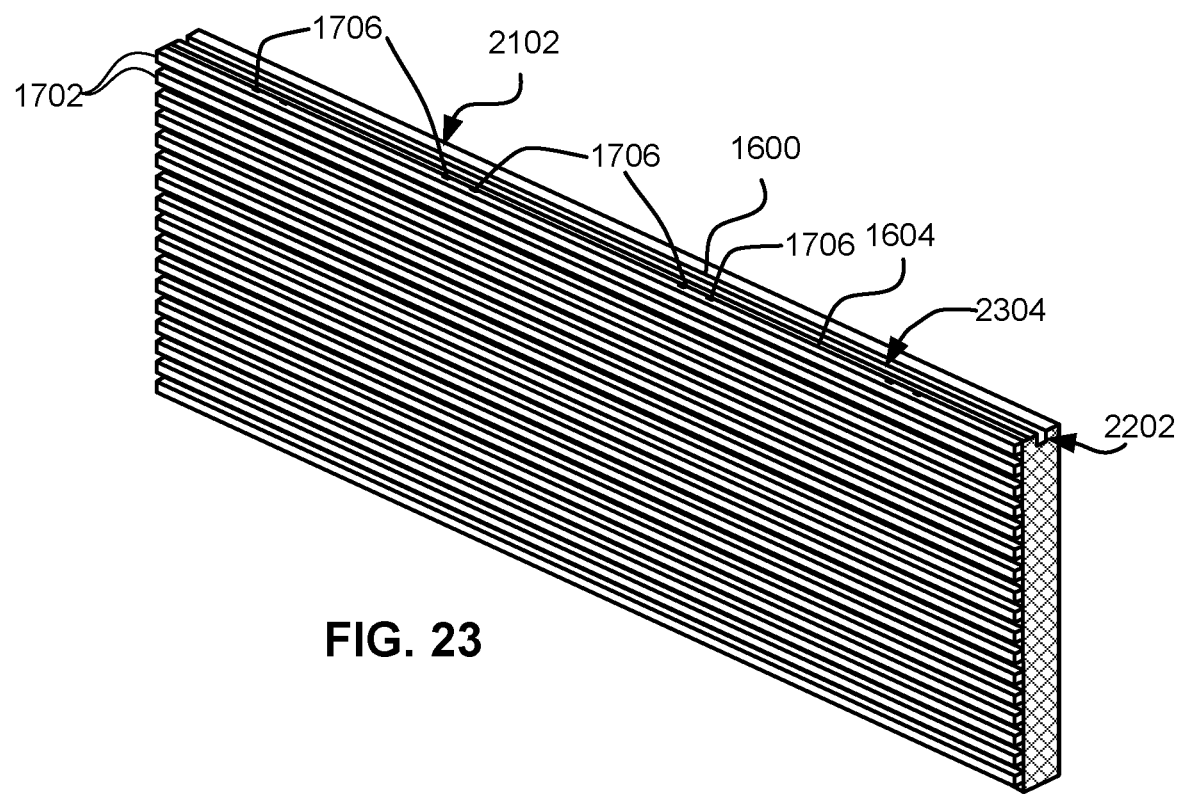
FIG. 23 is a perspective view of the section of wafer of FIG. 22 upon polishing an end thereof.

The end 2102 of the section 1600 is lapped for polishing the end 2102 and the closure 1702. Conventional lapping techniques may be used. FIG. 23 depicts the section 1600 with a polished end 2102. Once lapped, the polished surface of the end 2102 is amenable to use of optical detection techniques to identify features thereof. For example, features in the thin film layer 1604 are observable once the polishing is performed.

Figure 24:
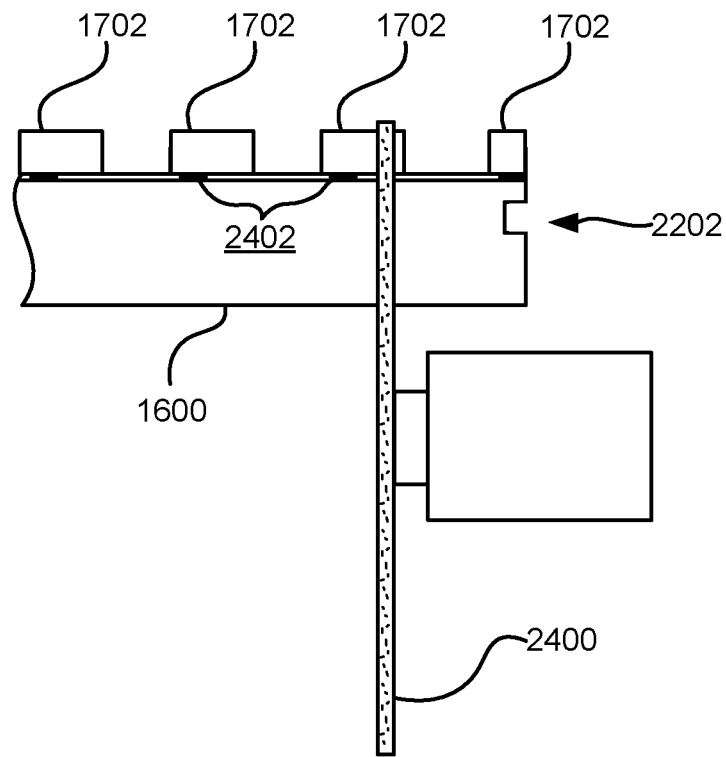
FIG. 24 is a side view depicting cutting of a row from a section of wafer.

Referring to FIG. 24, a row is lapped and then sliced from the section 1600. Transducers 2402 are also shown adjacent each closure 1702. Conventional cutting techniques may be used to slice the row from the section 1600. For example, a blade 2400 of conventional construction may be used to cut through the section 1600.

Figure 25:
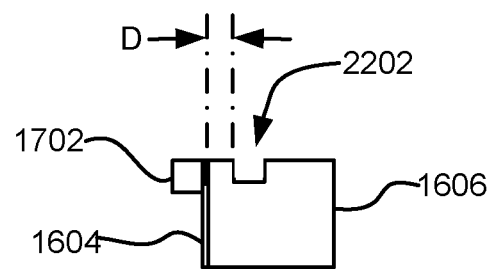
FIG. 25 is a side view of a row cut from a wafer.
Figure 26:
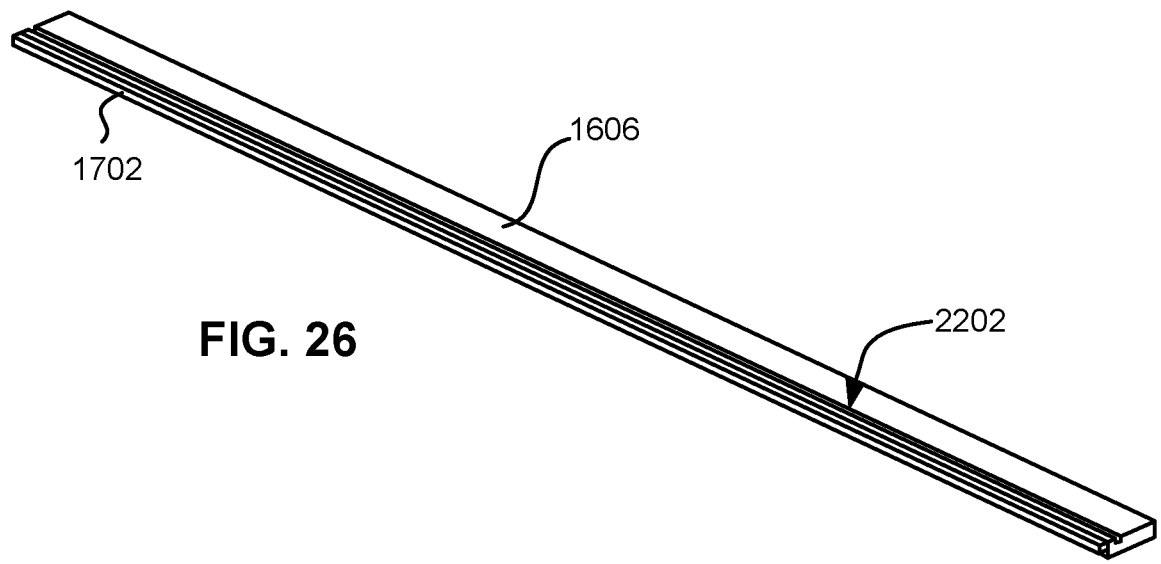
FIG. 26 is a perspective view of a row cut from a wafer after a back lap process to reduce a thickness thereof.

FIG. 25 depicts the row cut from the section 1600. Various process steps may be performed on the row. For example, a back lapping step may be performed on the substrate 1606 to reduce its thickness, and/or to create a smooth bottom end for subsequent processing. FIG. 26 depicts the row after back lapping.

Figure 27:
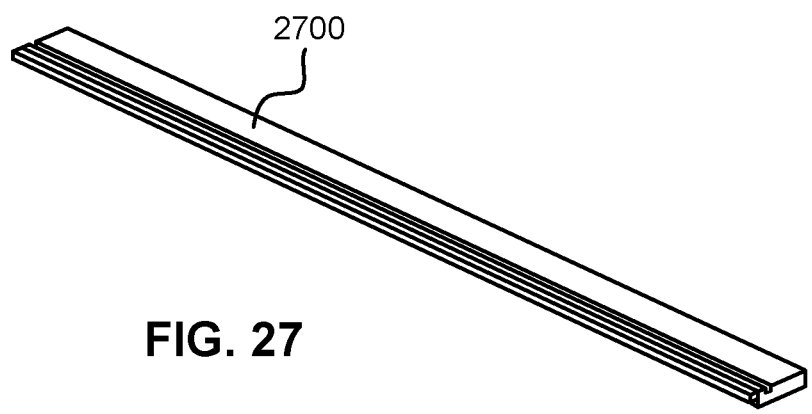
FIG. 27 is a perspective view of a chip cut from a row.

If the row includes multiple head images, the row may be cut into chips. Preferably, the rows are cut into individual thin film elements, or chips 2700, using traditional methods. See FIG. 27, which illustrates one chip 2700.

Figure 28:
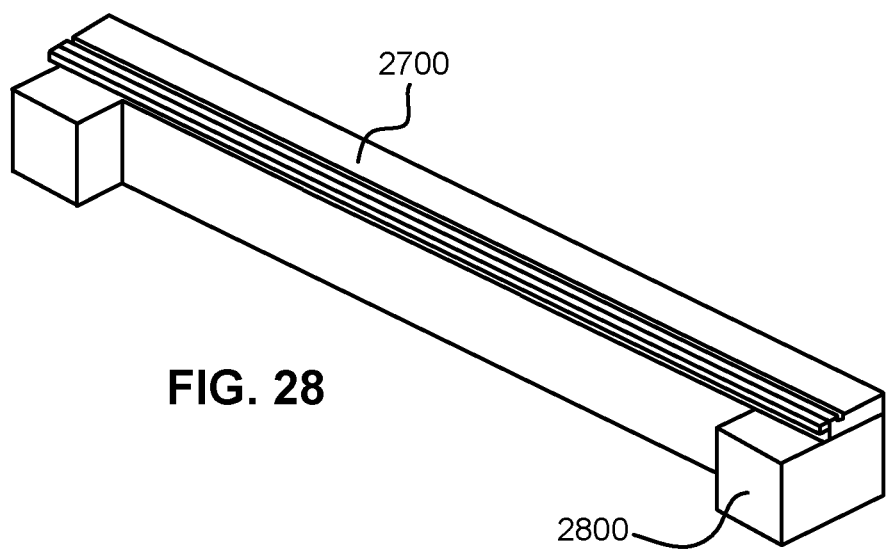
FIG. 28 is a perspective view of a U-beam with a chip coupled thereto, thereby forming a module.

Each chip 2700 may be coupled to a beam such as a U-beam 2800, as shown in FIG. 28. Various processes may be performed before or after coupling to the beam.

Additional processes may be performed, before or after the chip 2700 is coupled to a beam. For example, the row or chip may be lapped again, using conventional techniques such as KISS lapping on a charged plate, to remove a burr from the polished end, such as a bearing surface slot burr formed during formation of the bearing surface slot. Milling may be performed, e.g., for preparing the polished surface for application of a protective overcoat thereto. An overcoat may be applied to the polished end.

Figure 29:
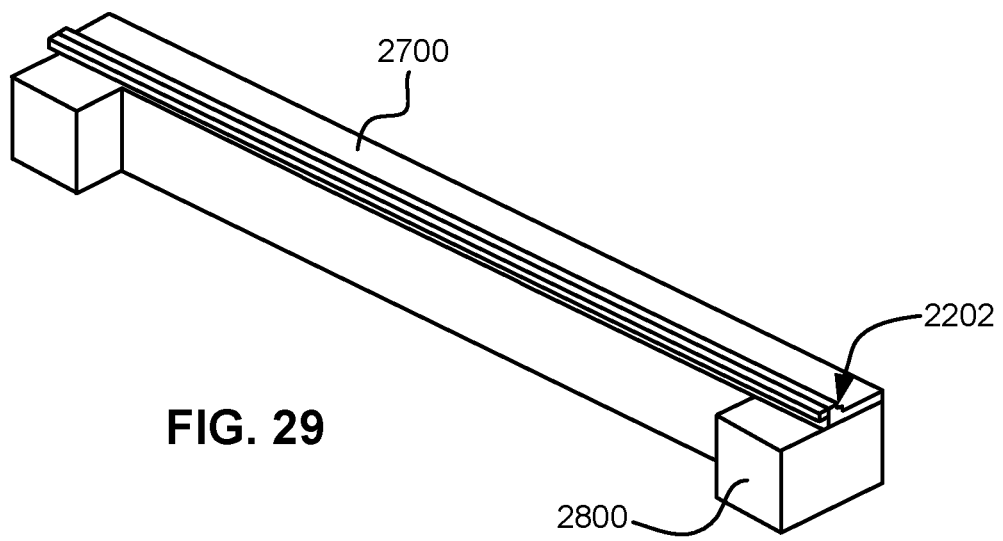
FIG. 29 is a perspective view of a module upon forming of a skiving edge thereon.

Before or after the cutting, the portion of the polished end located on an opposite side of the bearing surface slot as the circuitry is removed using a conventional technique such as grinding, e.g., a taperless grind technique. FIG. 29 shows the chip 2700 upon removal of the material. Preferably, the removal extends along the bearing surface slot, thereby allowing the remaining portion of the bearing surface slot to define the skiving edge of the tape bearing surface of the chip.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   a module having a tape bearing surface, and an array of transducers extending along the tape bearing surface,
   the module having an aperture extending therethrough from the tape bearing surface to an opposing side of the module for permitting passage of air therethrough to the tape bearing surface,
   wherein the module has a recessed portion extending into the tape bearing surface, the recessed portion extending along a length of the tape bearing surface between the array of transducers and a first end of the module, the aperture extending from the recessed portion to the opposing side for permitting passage of air therethrough into the recessed portion.

2. An apparatus as recited in claim 1, comprising a second recessed portion extending along a length of the tape bearing surface between the array of transducers and a second end of the module located on an opposite side of the array as the first end.

3. An apparatus as recited in claim 2, comprising a second module having a tape bearing surface, an array of transducers extending along the tape bearing surface, and a first and second recessed portion extending into the tape bearing surface on opposite sides of the array of transducers of the second module.

4. An apparatus as recited in claim 1, wherein the recessed portion extends to the first end of the module.

5. An apparatus as recited in claim 1, wherein the module has a skiving edge extending along a leading edge of the tape bearing surface thereof, the skiving edge extending along the array of transducers and the recessed portion.

6. An apparatus as recited in claim 1, wherein the recessed portion and the aperture are present in a closure of the module.

7. An apparatus as recited in claim 1, wherein the aperture is positioned closer to the array of transducers than the first end of the module.

8. An apparatus as recited in claim 1, comprising at least a second aperture extending through the module.

9. An apparatus as recited in claim 1, wherein the tape bearing surface is planar.

10. An apparatus as recited in claim 9, wherein portions of the tape bearing surface are beveled.

11. An apparatus as recited in claim 1, further comprising:
    a drive mechanism for passing a magnetic medium over the module; and
    a controller electrically coupled to the module.

\* \* \* \* \*